United States Patent
Jimenez et al.

(10) Patent No.: US 10,471,923 B2
(45) Date of Patent: Nov. 12, 2019

(54) OCCUPANT PROTECTION SYSTEM INCLUDING EXPANDABLE CURTAIN AND/OR EXPANDABLE BLADDER

(71) Applicant: Zoox, Inc., Menlo Park, CA (US)

(72) Inventors: Josh Alexander Jimenez, San Francisco, CA (US); Timothy David Kentley-Klay, Stanford, CA (US); Andrew John Piper, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/693,641

(22) Filed: Sep. 1, 2017

(65) Prior Publication Data

US 2019/0193665 A1    Jun. 27, 2019

Related U.S. Application Data

(60) Provisional application No. 62/445,157, filed on Jan. 11, 2017.

(51) Int. Cl.
*B60R 21/232* (2011.01)
*B60R 21/213* (2011.01)
(Continued)

(52) U.S. Cl.
CPC ........ *B60R 21/232* (2013.01); *B60R 21/0136* (2013.01); *B60R 21/01512* (2014.10);
(Continued)

(58) Field of Classification Search
CPC ................ B60R 21/213; B60R 21/232; B60R 21/23138
See application file for complete search history.

(56) References Cited

U.S. PATENT DOCUMENTS 3,774,936 A * 11/1973 Barnett ................. B60R 21/214
                                                                 280/730.1
5,470,103 A    11/1995 Vaillancourt et al.
(Continued)

FOREIGN PATENT DOCUMENTS

DE         4212416 A1 * 11/1992 .......... B60R 21/214
DE        10007343 A1    8/2001
(Continued)

OTHER PUBLICATIONS

Adolf Wissig, Air cushion curtain for protection of vehicle occupant—uses storage container attached to roof interior to hold curtain in front of occupant, Nov. 26, 1992, EPO, DE 42 12 416 A1, English Abstract (Year: 1992).*

(Continued)

*Primary Examiner* — James A English
(74) *Attorney, Agent, or Firm* — Lee & Hayes, P.C.

(57) ABSTRACT

An occupant protection system for a vehicle may include an expandable curtain and/or an expandable bladder configured to be expanded from a stowed state to a deployed state. In the deployed state, the expandable curtain may include first and second sides configured to extend along respective portions of first and second interior sides of the vehicle. The expandable curtain may also include a transverse portion extending between the first and second sides, and the first and second sides, and the transverse portion of the expandable curtain may form a contiguous barrier. The expandable bladder when deployed may be supported by the expandable curtain during contact by an occupant. The occupant protection system may also include a deployment control system configured to cause the expandable curtain and/or the expandable bladder to expand to the deployed state. The occupant protection system may be used in vehicles having a carriage-style seating arrangement.

20 Claims, 9 Drawing Sheets

(51) Int. Cl.
  *B60R 21/231* (2011.01)
  *B60R 21/2338* (2011.01)
  *B60R 21/0136* (2006.01)
  *B60R 21/015* (2006.01)
  *B60R 21/214* (2011.01)
  *B60R 21/01* (2006.01)

(52) U.S. Cl.
  CPC .......... *B60R 21/213* (2013.01); *B60R 21/214* (2013.01); *B60R 21/2338* (2013.01); *B60R 21/23138* (2013.01); *B60R 2021/01013* (2013.01); *B60R 2021/01286* (2013.01); *B60R 2021/23107* (2013.01); *B60R 2021/23386* (2013.01)

(56) References Cited

U.S. PATENT DOCUMENTS

| | | | |
|---|---|---|---|
| 6,382,660 B1* | 5/2002 | Starner | B60R 21/213 280/728.2 |
| 6,863,299 B2 | 3/2005 | Schneider et al. | |
| 6,913,280 B2 | 7/2005 | Dominissini et al. | |
| 6,932,380 B2 | 8/2005 | Choi | |
| 7,195,276 B2* | 3/2007 | Higuchi | B60R 21/231 280/729 |
| 7,222,877 B2* | 5/2007 | Wipasuramonton | B60R 21/214 280/729 |
| 7,726,684 B2 | 6/2010 | Breed | |
| 8,403,358 B2 | 3/2013 | Choi et al. | |
| 8,807,593 B2 | 8/2014 | Lee et al. | |
| 9,004,526 B2 | 4/2015 | Fukawatase et al. | |
| 9,446,735 B1* | 9/2016 | Jayasuriya | B60R 21/232 |
| 9,493,135 B2 | 11/2016 | Fukawatase | |
| 9,725,064 B1 | 8/2017 | Faruque et al. | |
| 9,802,568 B1 | 10/2017 | Larner | |
| 9,969,346 B2* | 5/2018 | Patel | B60R 21/233 |
| 9,994,182 B1 | 6/2018 | Jaradi et al. | |
| 10,279,770 B2 | 5/2019 | Faruque et al. | |
| 2006/0097492 A1* | 5/2006 | Bakhsh | B60R 21/232 280/730.2 |
| 2006/0226640 A1* | 10/2006 | Prakah-Asante | B60R 21/0134 280/735 |
| 2010/0140909 A1 | 6/2010 | Jang | |
| 2010/0225096 A1 | 9/2010 | Bustos Garcia et al. | |
| 2013/0197764 A1 | 8/2013 | Thomas | |
| 2014/0097601 A1* | 4/2014 | Fukawatase | B60R 21/231 280/730.2 |
| 2014/0375033 A1 | 12/2014 | Fukawatase | |
| 2016/0031401 A1 | 2/2016 | Jaradi et al. | |
| 2016/0311393 A1* | 10/2016 | Smith | B60R 21/232 |
| 2017/0225641 A1* | 8/2017 | Faruque | B60N 2/143 |
| 2017/0267204 A1* | 9/2017 | Farooq | B60R 21/231 |
| 2018/0215338 A1* | 8/2018 | Faruque | B60R 21/0136 |
| 2018/0222432 A1 | 8/2018 | Schneider | |
| 2019/0016291 A1 | 1/2019 | Paxton et al. | |
| 2019/0193666 A1 | 6/2019 | Jost et al. | |

FOREIGN PATENT DOCUMENTS

| | | |
|---|---|---|
| GB | 2385303 A | 8/2003 |
| WO | WO2005000638 A1 | 1/2005 |
| WO | WO2012122997 A1 | 9/2012 |

OTHER PUBLICATIONS

Adolf Wissig, Air cushion curtain for protection of vehicle occupant—uses storage container attached to roof interior to hold curtain in front of occupant, Nov. 26, 1992, EPO, DE 42 12 416 A1, Machine Translation of Description (Year: 1992).*
PCT Invitation to Pay Additional Fees mailed Apr. 24, 2018, for PCT application No. PCT/US2018/012793, 16 pages.
Passenger Airbag; Bag in Roof (BIR); Bustos, Alfonso and LeNorcy, Yohann, Cognitive Safety Systems; TRW Automotive, Apr. 2014; 19 pages.
Passenger Airbag: Bag in Roof Technology; TRW Occupant Safety Systems (2013); 2 pages.
Non-final Office Action dated Feb. 19, 2019 for U.S. Appl. No. 15/693,700, "Occupant Protection System Including Expandable Curtain and/or Expandable Bladder," Jost, 6 pages.
Office Action dated Jun. 10, 2019 for U.S. Appl. No. 15/693,700, Jost, "Occupant Protection System Including Expandable Curtain and/or Expandable Bladder", 10 pages.

* cited by examiner

OCCUPANT PROTECTION SYSTEM INCLUDING EXPANDABLE CURTAIN AND/OR EXPANDABLE BLADDER

RELATED APPLICATION

This application claims the benefit of priority under 35 U.S.C. § 119(e) of U.S. Provisional Application No. 62/445,157, filed Jan. 11, 2017, the disclosure of which is incorporated herein by reference.

BACKGROUND

Airbags are often used to protect occupants of a vehicle from injury during a collision involving the vehicle. An airbag system may often include an airbag and an inflator for providing the airbag with a gas to inflate the airbag. Upon involvement in a collision, the airbag may be rapidly inflated to create a cushion between the occupant and interior surfaces of the vehicle.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
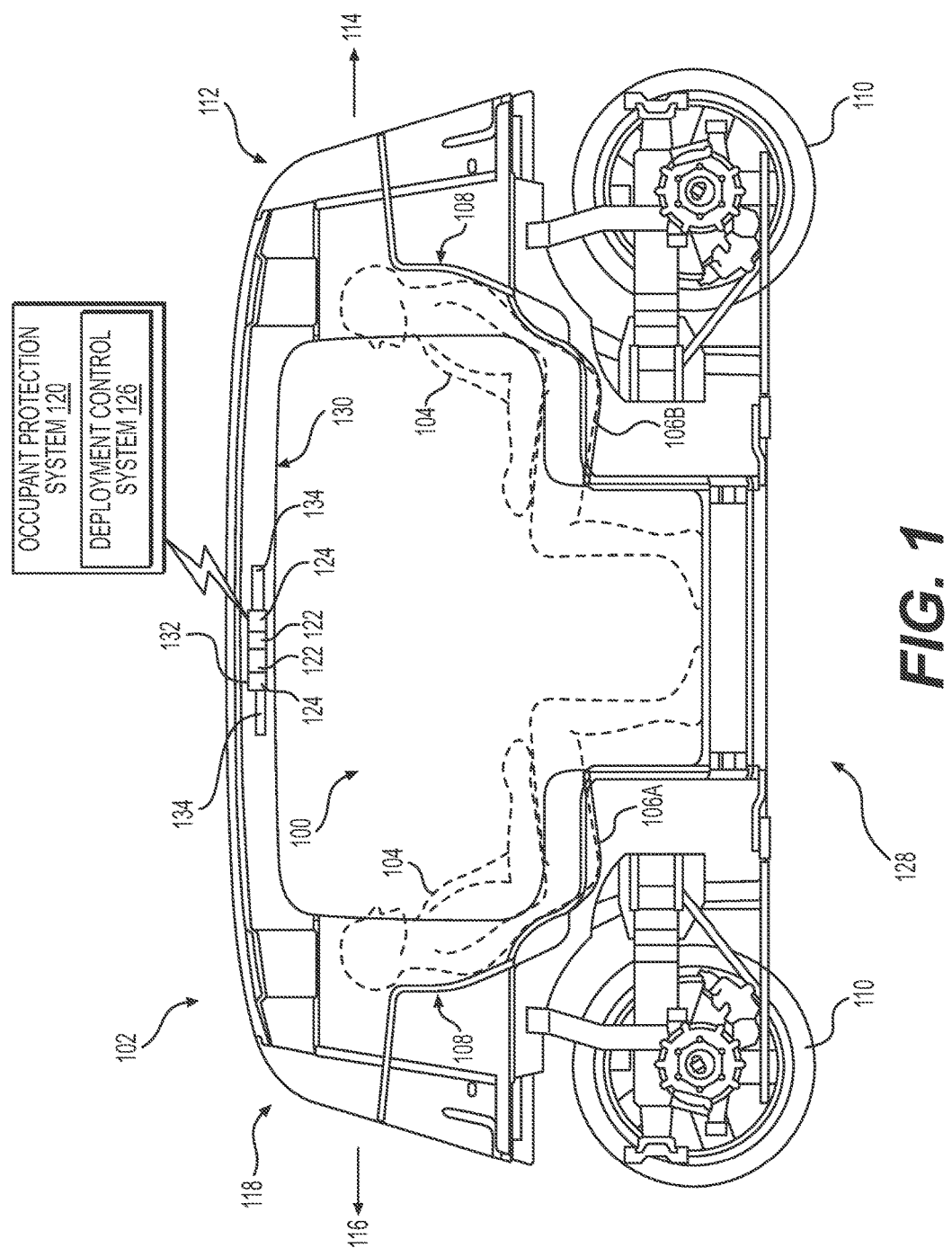
FIG. 1 is a cutaway side view of an example vehicle including an example occupant protection system.

As mentioned above, an airbag may be used to protect an occupant of a vehicle from injury during a collision involving the vehicle. An airbag system may include an airbag and an inflator for providing the airbag with a gas to inflate the airbag. Upon involvement in a collision, the airbag may be rapidly inflated to create a cushion between the occupant and interior surfaces of the vehicle. Different vehicle designs, however, may result in difficulty in protecting an occupant with a conventional airbag. For example, a conventional airbag, once deployed, relies on support from interior structures of the vehicle, such as a steering wheel, dashboard, or an interior panel, to provide the airbag with the ability to stop the movement of the occupant during the collision. Some vehicle designs do not provide such interior structures for all locations at which an occupant may be seated, and thus, a conventional airbag may not effectively protect such occupants. In addition, the components of an airbag system occupy space inside the vehicle and add weight to the vehicle, and it may be difficult to install the components of an airbag system in a location of the interior of the vehicle that permits the airbag to deploy at a rate sufficient to protect the occupant and/or with sufficient dimensions to protect the occupant. Some embodiments disclosed herein may address or mitigate at least some of the above-noted drawbacks.

This disclosure is generally directed to an occupant protection system including an expandable curtain and/or one or more expandable bladders configured to deploy to protect one or more occupants of a vehicle during a collision involving the vehicle. For example, an occupant protection system for a vehicle may include an expandable curtain configured to be expanded from a stowed state to a deployed state having a length configured to extend between a vehicle roof and a vehicle floor. In some examples, the expandable curtain may be configured to deploy and/or extend from a location adjacent or close to the vehicle roof to a point above the vehicle floor. In some examples, the expandable curtain may be configured to deploy and/or extend from a location adjacent or close to the vehicle roof to the vehicle floor. Some examples of the occupant protection system may be used in vehicles having a carriage-style seating arrangement in which two or more seats face one another, for example, in the vicinity of the center of the interior of the vehicle.

The expandable curtain in the deployed state may include a first side configured to extend along a portion of a first interior side of the vehicle, and a second side configured to extend along a portion of a second interior side of the vehicle. For example, the first side of the expandable curtain may be configured to extend substantially parallel to the first interior side of the vehicle, and/or the second side of the expandable curtain may be configured to extend substantially parallel to the second interior side of the vehicle. The expandable curtain may also include a transverse portion extending between the first side and the second side of the expandable curtain. The first side, the second side, and the transverse portion of the expandable curtain may be contiguous and form a continuous barrier. For example, the first side, the second side, and the transverse portion of the expandable curtain may be coupled to one another and/or may form a unitary barrier extending from one end of the first side of the expandable curtain to one end of the second side of the expandable barrier. The occupant protection system may also include a deployment control system configured to cause the expandable curtain to expand from the stowed state to the deployed state. For example, the deployment control system may be configured to activate one or more inflators in flow communication with the first side, the second side, and the transverse portion of the expandable curtain to, for example, rapidly expand the first side, the second side, and the transverse portion of the expandable curtain in response to an impact.

In some examples, the occupant protection system may also include an expandable bladder configured to expand from a stowed state to a deployed state associated with the transverse portion of the expandable curtain. For example, the expandable bladder may be configured to deploy and/or extend from a location adjacent or close to the vehicle roof and adjacent the expandable curtain. In some examples, at least a portion of the first side of the expandable curtain and at least a portion of the second side of the expandable curtain may extend away from a support face side of the of the transverse portion of the expandable curtain, and the expandable bladder may be associated with the support face side of the transverse portion and may be located between the first side and the second side of the expandable curtain.

In some examples, the deployment control system may be configured to cause the expandable bladder to expand from the stowed state to the deployed state. For example, the deployment control system may be configured to activate one or more inflators in flow communication with the expandable bladder to, for example, rapidly expand the expandable bladder in response to an impact. In some examples, the one or more inflators associated with expanding one or more portions of the expandable curtain may be different than the one or more inflators associated with expanding the expandable bladder. In some examples, the one or more inflators associated with expanding one or more portions of the expandable curtain may be the same as the one or more inflators associated with expanding the expandable bladder.

In some examples, the deployment control system may be configured to cause the expandable curtain to deploy and/or expand from the stowed state to the deployed state at a first time, and thereafter cause the expandable bladder to expand from the stowed state to the deployed state at a second time following the first time. In some examples, the deployment control system may be configured to cause the expandable curtain and the expandable bladder to deploy and/or expand concurrently or substantially simultaneously from the stowed state to the deployed state.

The occupant protection system, in some examples, may facilitate the effectiveness of the expandable curtain and/or expandable bladder in protecting an occupant during a collision involving the vehicle, for example, having a vehicle design for which an interior structure does not exist in a position within a threshold distance (e.g., within 1 to 2 meters) in front of a seating position of an occupant. For example, some vehicle designs may not include a reaction surface, such as an interior structure within the threshold distance in front of an occupant seat, and thus, there is no structure against which to support an airbag once it has deployed. The effectiveness of protecting the occupant of such a seat during a collision using an airbag might be compromised, since there is no interior structure against which the airbag can abut to assist with stopping the movement of the occupant during the collision. In some examples of the occupant protection system described herein, the expandable curtain, once deployed may provide a support against which the expandable bladder may abut to assist with arresting the movement of the occupant during the collision. In some examples, the expandable curtain may be deployed to provide the support for the expandable bladder, for example, prior to or concurrently (substantially simultaneously) with deployment of the expandable bladder. In some examples, when the occupant is thrown forward toward the expandable bladder during a collision, the occupant will contact the expandable bladder and press the expandable bladder against the expandable curtain, which will provide support for the expandable bladder and prevent the expandable bladder from deflecting and allowing the occupant to continue to be thrown forward in an uncontrolled manner. In some examples, only the expandable curtain may be deployed, for example, without deploying the expandable bladder. Such examples may be effective in preventing loose objects in the interior of the vehicle from becoming uncontrolled projectiles during a collision. Some examples of the occupant protection system described herein may provide protection for occupants in vehicles that do not have an interior structure within a threshold distance in front of one or more of the seats.

In some examples, the first side, the second side, and the transverse portion of the expandable curtain may collectively define a substantially U-shaped cross-section transverse to the length of the expandable curtain (e.g., as the expandable curtain extends between the vehicle roof and the vehicle floor). In some examples, the occupant protection system may include a first tether coupled to the first side and/or the transverse portion of the expandable curtain and coupled to a portion of the vehicle, such as, for example, a portion associated with the first interior side, the floor, or the roof of the vehicle. The occupant protection system may also include a second tether coupled to the second side and/or transverse portion of the expandable curtain and configured to be coupled to a portion of the vehicle, such as, for example, a portion associated with the second interior side, the floor, or the roof of the vehicle. In some examples, the first and second tethers may assist with preventing the expandable curtain, once deployed, from swinging in a direction away from the occupant during the collision. In some examples, this may assist with preventing the expandable bladder from swinging or otherwise moving in a direction away from the occupant during the collision.

The occupant protection system, in some examples, may also include a second expandable bladder configured to expand from a stowed state to a deployed state associated with the transverse portion of the expandable curtain. In some examples, the first expandable bladder and/or the second expandable bladder may be coupled to the transverse portion of the expandable curtain. In some examples, the first expandable bladder and/or the second expandable bladder may not be coupled to the transverse portion of the expandable curtain. For example, the first and/or second expandable bladder may be coupled, directly or indirectly, to the vehicle roof independently of one another and/or independently of the expandable curtain. For example, the deployment control system may be configured to cause the one or more of the first expandable bladder, the second expandable bladder, or the expandable curtain to expand from the stowed state to the deployed state, for example, by activating one or more inflators associated with one or more of the first expandable bladder, the second expandable bladder, or the expandable curtain. Thus, the first expandable bladder, the second expandable bladder, and the expandable curtain may be deployed together, concurrently or substantially simultaneously, or may be deployed independently of one another. By deploying them independently, the packaging of the occupant protection system may be improved by, for example, reducing the size of gas generators associated with the inflators and/or the housing(s) used to contain the undeployed first and second expandable bladders and expandable curtain. In some examples, the expandable curtain and/or expandable bladders may deploy more rapidly due to the possibility of reducing their respective volumes.

The expandable curtain, in some examples, may include a transverse portion configured to divide the interior of the vehicle. For example, if the vehicle includes a carriage-style seating arrangement including seats that face one another, the transverse portion may extend between two seats that face one another and divide the interior of the vehicle at a longitudinal point of the interior of the vehicle at which the transverse portion is located. In some examples, the transverse portion includes an expandable support chamber substantially centered in the transverse portion and configured to expand into the interior of the vehicle. The expandable support chamber may include a vertical portion configured to extend at least a portion of the distance between the vehicle roof and the vehicle floor when expanded, and a horizontal portion extending at least partially from the first side to the second side of the expandable curtain. In some examples, the occupant protection system may also include a first lateral portion extending along the first side of the expandable curtain, and the first lateral portion may extend from a first end of the horizontal portion. The occupant protection system may also include a second lateral portion extending along the second side of the expandable curtain, and the second lateral portion may extend from a second end of the horizontal portion.

In some examples, one or more of the horizontal portion or the vertical portion of the expandable support chamber may have a non-uniform cross-sectional area when expanded. For example, the cross-sectional area of the horizontal portion may decrease from a maximum value at a center region along the transverse portion to a minimum value at one or more of the first side or the second side of the expandable curtain.

In some examples, one or more of the first side of the expandable curtain, the first lateral portion of the transverse portion, the expandable support chamber, the second lateral portion of the transverse portion, or the second side of the expandable curtain may be contiguous and form a continuous barrier extending from the first side of the expandable curtain to the second side of the expandable curtain.

The first side, second side, and transverse portion of the expandable curtain, in some examples, may cause the expandable bladders to remain relatively centered in front of respective occupants when the respective occupants contact the respective expandable bladders. For example, the first side, the first lateral portion of the transverse portion, and the vertical and horizontal portions of the expandable support chamber may form a recess or pocket into which a corresponding expandable bladder may be received or nest, thereby biasing the expandable bladder to remain centered in front of the occupant as the occupant contacts the expandable bladder.

Some examples of the expandable bladder may include a coupling portion configured to be coupled to a portion of the vehicle associated with the vehicle roof. The expandable bladder may also include first and second expandable lateral arresters associated with the coupling portion, and a lower support associated with the first and second expandable lateral arresters. In some examples, the expandable bladder may also include a central expandable arrester associated with the lower support and configured to pivot relative to the lower support upon contact with a portion of an occupant of the vehicle. In some examples, the coupling portion, the first expandable lateral arrester, the second expandable lateral arrester, and/or the lower support may form an expandable arrester chamber. In some examples, the expandable arrester chamber may be substantially continuous and may be, for example, substantially horseshoe-shaped or ring-shaped and define a central space. The central expandable arrester may be configured to pivot into the central space upon contact by the occupant of the vehicle. In some examples, the central expandable arrester and the first and second expandable lateral arresters may be configured such that the central expandable lateral arrester pivots to a position at least partially between the first and second expandable lateral arresters upon contact with the portion of the occupant of the vehicle. In some examples, the central expandable arrester and the first and second expandable lateral arresters are configured such that shoulders of the occupant of the vehicle contact the first and second expandable lateral arresters, and the head of the occupant of the vehicle contacts the central expandable arrester.

In some examples, the deployment control system may be configured to receive a signal indicative of a predicted collision involving the vehicle and/or a collision involving the vehicle, and cause deployment of the expandable curtain, the first expandable bladder, and/or the second expandable bladder based at least in part on the signal. For example, sensors associated with the vehicle may predict an imminent collision involving the vehicle or may detect a collision upon occurrence, and the deployment control system may receive one or more signals associated with the prediction and/or detection, and activate the occupant protection system by deploying the expandable curtain, the first expandable bladder, and/or the second expandable bladder.

In some examples, the deployment control system may be configured to receive a signal indicative of the presence of an occupant in a first location of the vehicle associated with a first expandable bladder, and cause deployment of the expandable bladder associated with the position of the occupant based at least in part on the signal. For example, the vehicle may include an object classification system associated with a seat in the vehicle, and the vehicle may be able to determine whether an object and/or occupant is present in the seat. The deployment control system may receive one or more signals associated with whether an object and/or occupant is in the seat, and based at least in part on the signal(s), determine whether to initiate deployment, before or during a collision, of the expandable curtain and/or the expandable bladder. For example, if the signal indicates that an occupant is not present in the seat, the deployment control system may not initiate deployment of the expandable curtain or the expandable bladder. This may prevent unnecessary deployment and prevent costs associated with servicing deployed parts of the occupant protection system. Alternatively, if the signal indicates that an occupant is present in the seat, the deployment control system may initiate deployment of the expandable curtain and/or the expandable bladder associated with the position of the occupant to protect the occupant during the collision.

In some examples, the deployment control system may be configured to receive a signal indicative of whether the occupant is properly wearing a seatbelt, and cause deployment of the expandable curtain and/or the expandable bladder associated with the position of the occupant based at least in part on the signal indicative of whether the occupant is properly wearing the seatbelt. For example, the vehicle may include sensors and/or a system to determine whether the occupant is properly wearing a seatbelt. The deployment control system may receive one or more such signals and, based at least in part on the signal(s), initiate and/or control deployment of the expandable curtain and/or the expandable bladder. For example, if the occupant is wearing a seatbelt, the deployment control system may reduce the deployment rate and/or the deployment volume (or pressure) of the expandable curtain and/or the expandable bladder, for example, since the seatbelt will be expected to assist with preventing injury to the occupant during the collision. If, on the other hand, occupant is not properly wearing a seatbelt, the deployment control system may maintain or increase the deployment rate and/or the deployment volume (or pressure) of the expandable curtain and/or the expandable bladder, for example, since the seatbelt will not be expected to assist with preventing injury to the occupant during the collision.

The deployment control system, in some examples, may be configured to receive a signal indicative of a direction of travel of the vehicle, and cause deployment of the expandable curtain and/or the expandable bladder based at least in part on the signal indicative of the direction of travel of the vehicle. For example, the vehicle may be a bi-directional vehicle configured to travel between locations with either end of the vehicle being the leading end. In such vehicles, a seat may be facing the direction of travel when the vehicle is traveling with one end of the vehicle being the leading end, but with the seat facing rearward with the other end of the vehicle being the leading end. The vehicle may include sensors and/or a system configured to generate one or more signals indicative of whether the vehicle is traveling in a direction such that the seat is facing forward or the seat is facing rearward. The deployment control system may be configured to prevent deployment of the expandable curtain and/or the expandable bladder associated with the seat when the seat is facing rearward based at least in part on the signal(s). This may prevent unnecessary deployment and costs associated with servicing deployed parts of the occupant protection system. Alternatively, if the seat is facing forward, the deployment control system may initiate deployment of the expandable curtain and/or the expandable bladder associated with the position of the seat to protect the occupant during the collision.

In some examples, the expandable curtain may be located in the vehicle such that the transverse portion of the expandable curtain, when deployed, may be located in front of one or more seats of the vehicle (e.g., the seat(s) facing the transverse portion of the expandable curtain), and the one or more seats may be located between the first side and the second side of the expandable curtain. In some examples, the expandable bladder is at least partially stowed in a portion of the vehicle associated with the vehicle roof and is configured to expand from the stowed state to the deployed state between the transverse portion of the expandable curtain and the seat. For example, at least a portion of the first side of the expandable curtain and at least a portion of the second side of the expandable curtain extend from a support face side of the of the transverse portion of the expandable curtain (e.g., the side facing the seat), and the expandable bladder is associated with the support face side of the transverse portion of the expandable curtain and is located between the transverse portion of the expandable curtain and the seat, and between the first side and the second side of the expandable curtain.

Some vehicles may include a first seat coupled to a portion of the vehicle and facing a first direction relative to a longitudinal axis of the vehicle, and the vehicle may also include a second seat coupled to a portion of the vehicle and facing a second direction opposite the first direction. In some examples of the occupant protection system, the first side of the expandable curtain and the second side of the expandable curtain may extend from the transverse portion of the expandable curtain in the second direction toward the first seat. The occupant protection system may also include a first expandable bladder at least partially stowed in a portion of the vehicle and configured to expand from a stowed state to a deployed state. The first expandable bladder may be configured to deploy between the transverse portion of the expandable curtain and the first seat. Some examples of the occupant protection system may include first and second expandable curtains at least partially stowed in a portion of the vehicle and configured to be expanded from a stowed state to a deployed state having a length configured to extend between the roof and the floor. In some such examples, the system may include a second expandable bladder at least partially stowed in a portion of the vehicle and configured to expand from a stowed state to a deployed state, and the second expandable curtain may be configured to deploy between the first expandable curtain and the second seat. In some examples, the second expandable bladder may be configured to deploy between the second expandable curtain and the second seat. In such example systems, protection may be provided for occupants of seats facing both directions. For example, the seats may face one another, and the first and second expandable curtains may be configured to deploy between the two seats. In some examples, the deployment control system may be configured to receive one or more signals indicative of a direction of travel of the vehicle, and cause deployment of the first expandable curtain and/or the second expandable curtain. For example, the first expandable curtain, the first expandable bladder, the second expandable curtain, and/or the second expandable bladder may be deployed based at least in part on the one or more signals indicative of the direction of travel of the vehicle. For example, if the vehicle is traveling with the first seat facing the direction of travel, before or during a collision, the deployment control system may deploy the first expandable curtain and/or the first expandable bladder (e.g., associated with the first seat), and if the vehicle is traveling with the second seat facing the direction of travel, before or during a collision, the deployment control system may deploy the second expandable curtain and/or the second expandable bladder (e.g., associated with the second seat).

The techniques and systems described herein may be implemented in a number of ways. Example implementations are provided below with reference to the figures.

FIG. 1 is a side cutaway view of showing an interior 100 of an example vehicle 102 including a pair of occupants 104. The example vehicle 102 may be configured to travel via a road network from one geographic location to a destination carrying one or more of the occupants 104. For example, the interior 100 may include a plurality of seats 106, which may be provided in any relative arrangement. The example vehicle 102 shown in FIG. 1 includes an example carriage-style seating arrangement in a substantially central portion of the interior 100 of the vehicle 102. For example, the vehicle 102 may include two or more rows 108 of seats 106, and in some examples, two of the rows 108 of seats 106 may face each other, for example, as shown in FIG. 1. One or more of the rows 108 of the seats 106 may include two seats 106 (e.g., seats 106A and 106B). Other relative arrangements and numbers of seats 106 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal.

This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the front end of the vehicle 102 when travelling in a first direction 114, and such that the first end 112 becomes the rear end of the vehicle 102 when traveling in the opposite, second direction 116, as shown in FIG. 1. Similarly, a second end 118 of the vehicle 102 is the front end of the vehicle 102 when travelling in the second direction 116, and such that the second end 118 becomes the rear end of the vehicle 102 when traveling in the opposite, first direction 114. These example characteristics may facilitate greater maneuverability, for example, in small spaces or crowded environments, such as parking lots and urban areas.

Figure 2:
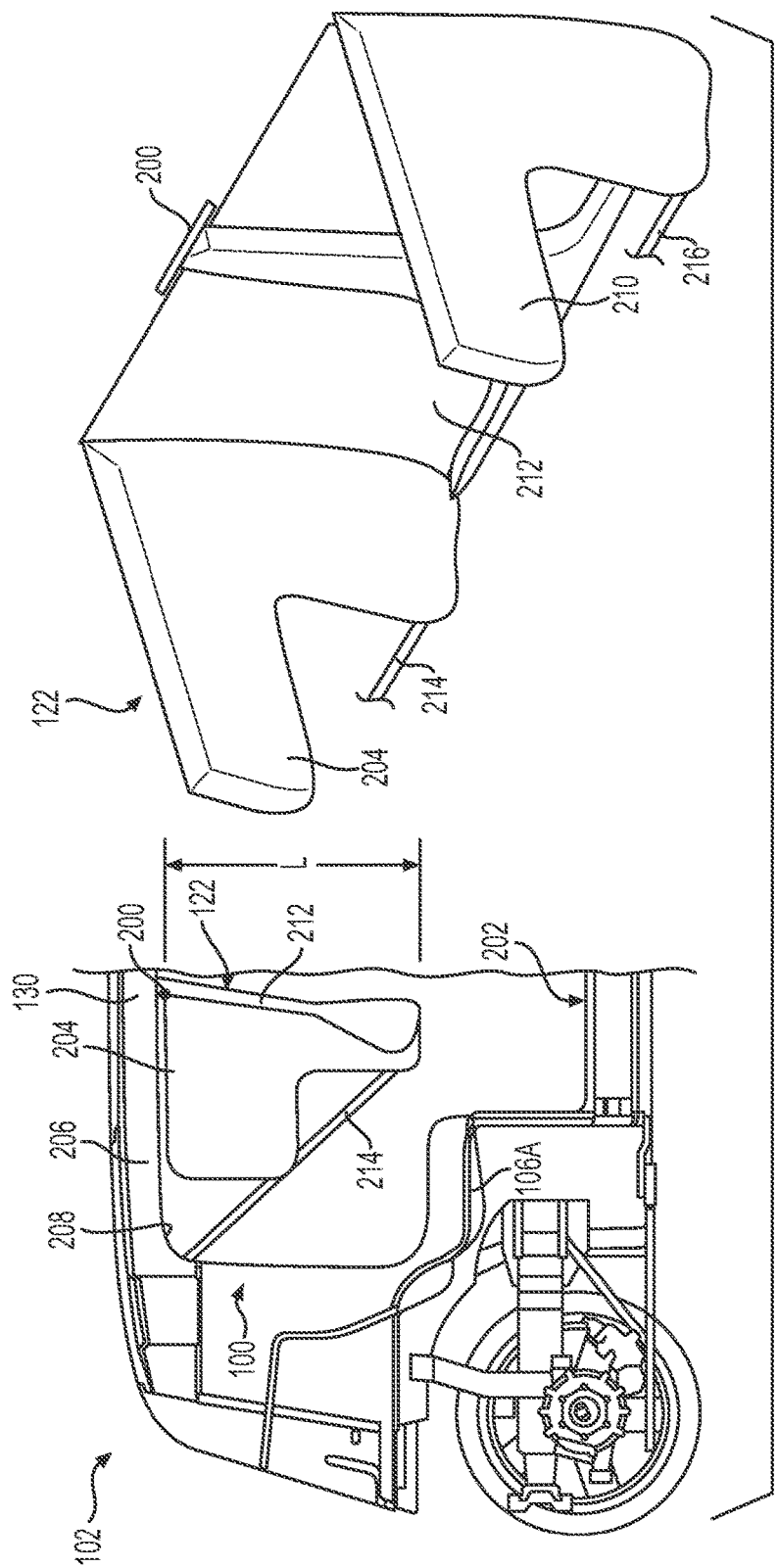
FIG. 2 is a partial side view of the example vehicle shown in FIG. 1 with an example expandable curtain shown in a deployed state.
Figure 3:
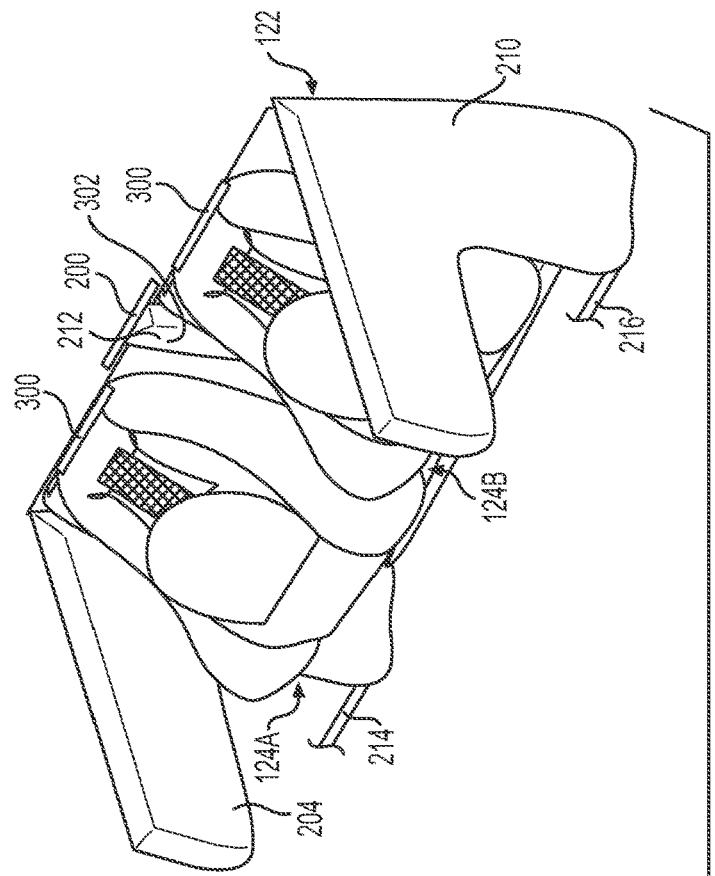
FIG. 3 is a partial side view of the example vehicle shown in FIG. 1 with an example expandable curtain and an example expandable bladder shown in a deployed state.
Figure 3:
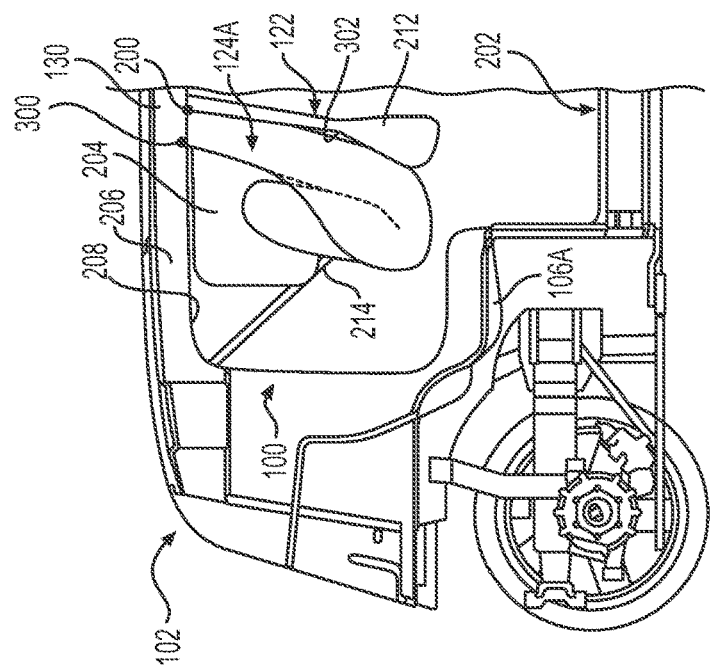

As shown in FIG. 1, the vehicle 102 may include an occupant protection system 120 configured to protect one or more of the occupants 104 during a collision involving the vehicle 102. For example, the occupant protection system 120 may include one or more of an expandable curtain 122, one or more expandable bladders 124, and a deployment control system 126 configured to control deployment of one or more of the expandable curtains 122 and one or more of the expandable bladders 124, so that they deploy from a stowed state, for example, as shown in FIG. 1, to a deployed state, for example, as shown in FIGS. 2 and 3. In some examples, the occupant protection system 120 may also include a seatbelt system that includes a seatbelt for each of one or more of the occupants 104, for example, as explained in more detail herein. The expandable curtain 122 and/or the expandable bladders 124 may be formed from, for example, a woven nylon fabric and/or other similar materials, or materials having suitable characteristics.

As shown in FIG. 1, the example vehicle 102 includes a chassis 128 including a vehicle roof 130 having a housing 132 configured to receive the expandable curtain(s) 122 and/or the expandable bladder(s) 124, each in the stowed (e.g., unexpanded state). In some examples, the expandable curtain(s) 122 and/or expandable bladder(s) 124 may be stored individually in separate housings. In some examples (e.g., those examples where portions of the expandable curtain(s) are separate), each portion may be stored individually in separate housings. In some examples, upon receipt of one or more signals from the vehicle 102, the deployment control system 126 may be configured to activate one or more inflators 134 in flow communication with the expandable curtain(s) 122 and/or the expandable bladder(s) 124, such that the inflators 134 provide a fluid or gas to the expandable curtain(s) 122 and/or expandable bladder(s) 124, so that that the expandable curtain(s) 122 and/or the expandable bladder(s) 124 may rapidly expand from their stowed state (FIG. 1) to their respective deployed states, for example, as shown in FIGS. 2 and 3. For example, the inflators 134 may include a gas generator, pyrotechnic charge, propellants, and/or any other suitable devices or systems. The expandable curtain(s) 122 and/or expandable bladder(s) 124 may be configured to deploy in, for example, less than 100 milliseconds or less than 50 milliseconds. As explained herein, the expandable curtain(s) 122 and/or the expandable bladder(s) 124, in the deployed state may protect an occupant 104 from injury (or reduce its likelihood or severity) during a collision involving the vehicle 102 by providing a cushion between the occupant 104 and interior structures of the vehicle 102, so that the occupant 104 will be prevented from being thrown into the interior structures and/or, in some instances, being ejected from the vehicle 102.

FIG. 2 is a side view of a portion of the example vehicle 102 shown in FIG. 1 with the occupants 104 omitted to aid clarity. FIG. 2 shows an example expandable curtain 122 in the deployed (e.g., expanded) state in the interior 100 of the vehicle 102. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling.

The example expandable curtain 122 may be configured to be expanded from a stowed state, for example, as shown in FIG. 1, to a deployed state, for example, as shown in FIG. 2, having a length L configured to extend between the vehicle roof 130 and a vehicle floor 202. As shown, in some examples, the expandable curtain 122 extends toward the vehicle floor 202 and terminates at a location spaced above the vehicle floor 202. In some examples, the expandable curtain may 122 extend to and terminate at the vehicle floor 202. In the example shown, the expandable curtain 122 in the deployed state may include first side 204 configured to extend along a portion of a first interior side 206 of the vehicle 102. For example, the first side 204 of the expandable curtain 122 may extend in a direction substantially parallel to the first interior side 206 of the vehicle 102. In some examples, the first side 204 of the expandable curtain 122 may be deployed from a housing located above the opening 208 in the first interior side 206 and or from the vehicle roof 130 of the vehicle 102. In some examples, the first side 204 of the expandable curtain 122 may be inflatable and may be configured to provide cushioning between the occupant 104 and the first interior side 206 of the vehicle 102.

In some examples, the expandable curtain 122 may also include a second side 210 opposite the first side 204 configured to extend along a portion of a second interior side (not shown in FIG. 2 due to limitations of the view provided) of the vehicle 102. The first and second interior sides of the vehicle 102 may be on opposite sides of the vehicle 102 and may extend substantially parallel to one another. In some examples, the second side 210 of the expandable curtain 122 may have structural, location, stowage, and/or deployment characteristics similar to, or the same as, the first side 204 of the expandable curtain 122, except that it may be located on the second interior side of the vehicle 102 and may be different to accommodate differences with being on the second interior side of the vehicle 102 instead of the first interior side 206.

As shown in FIG. 2, the example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define a substantially U-shaped cross-sectional area as created by a plane normal to length L shown in FIG. 2. In some examples, the first side 204, the second side 210, and the transverse portion 212 of the expandable curtain 122 form a continuous barrier. In some examples, one or more of the first side 204, the second side 210, or the transverse portion 212 of the expandable curtain 122 may include an additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of the interior trim of the vehicle 102 configured to permit the expandable curtain to deploy from underneath the trim.

In some examples, the occupant protection system 120 may include a first tether 214 coupled to the first side 204 and/or transverse portion 212 of the expandable curtain 122 and coupled to a portion of the vehicle 102, such as, for example, a portion associated with (e.g., directly or indirectly coupled to) the first interior side 206 (e.g., an interior panel or a structural member of the vehicle chassis 128) the floor 202, or the roof 130 of the vehicle 102, for example, as shown in FIG. 2. For example, the first tether 214 may at one end be coupled to a free edge of the first side 204 of the expandable curtain 122, and at a second end coupled to an anchor associated with the first interior side 206 of the vehicle 102 and/or the vehicle roof 130. The occupant protection system 120 may also include a second tether 216 coupled to the second side 210 and/or transverse portion 212 of the expandable curtain 122 and configured to be coupled to a portion of the vehicle 102, such as, for example, a portion associated with (e.g., directly or indirectly coupled to) the second interior side, the floor 202, or the roof 130 of the vehicle 102, for example, in manner at least similar to the first tether 214. In some examples, the first and second tethers 214 and 216 may assist with preventing the expandable curtain 122, once deployed, from swinging in a direction away from the occupant 104 during the collision, for example, as the occupant 104 contacts the expandable curtain 122, either directly or indirectly, as explained herein.

FIG. 3 shows an example occupant protection system 120 with the example expandable curtain 122 and an example first expandable bladder 124A and an example second expandable bladder 124B in a deployed (e.g., expanded) state. In the example shown, the expandable bladders 124A and 124B have been deployed from the vehicle roof 130 and are coupled to the vehicle roof 130 at an attachment points 300. For example, the expandable bladders 124A and 124B shown in FIG. 3 have expanded from a stowed state to a deployed state, and are associated with (e.g., directly or indirectly coupled to) the transverse portion 212 of the expandable curtain 122, for example, such that the expandable curtain 122 may support the expandable bladders 124A and 124B when an occupant 104 contacts one of the expandable bladders 124A or 124B as the occupant 104 is urged forward in the direction toward which the seat 106 is facing and into the expandable bladders 124A and 124B (i.e., from left-to-right as shown in FIG. 3). For example, the transverse portion 212 of the expandable curtain 122 includes a support face side 302 facing the seat 106 and the expandable bladders 124A and 124B, and as the occupant 104 contacts one of the expandable bladders 124A or 124B, the expandable bladder 124A or 124B presses against the support side face 302 of the expandable curtain 122. The expandable curtain 122, suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 106 is facing and the direction in which the occupant 104 is moving. In this example manner, the occupant protection system 120 may protect the occupant 104 during a collision involving the vehicle 102, by preventing the occupant 104 from colliding in an un-cushioned or unprotected manner with interior structures of the vehicle 102 and/or, in some instances, preventing the occupant 104 from being ejected from the vehicle 102.

In the example shown in FIG. 3, at least a portion of the first side 204 of the expandable curtain 122 and at least a portion of the second side 210 of the expandable curtain 122 extend away from the support face side 302 of the of the transverse portion 212 of the expandable curtain 122. In some examples, one or more of the expandable bladders 124A or 124B may be associated with (e.g., directly or indirectly coupled to) the support face side 302 of the transverse portion 212 and may be located between the first side 204 and the second side 210 of the expandable curtain 122, for example, as shown in FIG. 3.

The first expandable bladder 124A and/or second expandable bladder 124B may each be configured to expand from a stowed state to a deployed state associated with the transverse portion 212 of the expandable curtain 122, for example, as shown in FIG. 3. In some examples, the first expandable bladder 124A and/or the second expandable bladder 124B may be coupled to the transverse portion 212 of the expandable curtain 122. In some examples, the first expandable bladder 124A and/or the second expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the first side 204, the second side 210, and/or the transverse portion 212 of the expandable curtain 122 may be configured such that when the expandable curtain 122 is deployed, the lower edge of the transverse portion 212 is closer to the seat 106 toward which the first side 204 and second side 210 extend than the upper portion of the transverse portion 212, thereby resulting in the transverse portion 212 extending downward toward the floor of the vehicle 102 and creating an angle relative to vertical, for example, as shown in FIG. 3. This angle may be created by a contraction of the first side 204 and/or the second side 210 as the expandable curtain 122 is deployed. This example configuration results the lower edge of the expandable curtain 122 being closer to the lower portion of the chest an occupant in the seat 106 than an upper portion of the chest and/or head of the occupant upon deployment. This creates a surface against which the first and/or second expandable bladders 124A and 124B may react and which results in arresting the lower portion of the chest of the occupant and allowing the upper chest and/or head of the occupant to continue forward and pivot downward into/against one of the expandable bladders 124 as the occupant is arrested by the expandable bladder 124.

In some examples, the deployment control system 126 (FIG. 1) may be configured to cause the one or more of first expandable bladder 124A, the second expandable bladder 124B, or the expandable curtain 122 to expand from the stowed state to the deployed state, for example, by activating one or more inflators 134 (FIG. 1) associated with (e.g., in flow communication with) one or more of the first expandable bladder 124A, the second expandable bladder 124B, or the expandable curtain 122. The first expandable bladder 124A, the second expandable bladder 124B, and the expandable curtain 122 may be deployed together, concurrently or substantially simultaneously, or may be deployed independently of one another. For example, the deployment control system 126 may be configured to cause the expandable curtain 122 to deploy and/or expand from the stowed state to the deployed state at a first time, and thereafter cause the first expandable bladder 124A and/or the second expandable bladder 124B to expand from the stowed state to the deployed state at a second time following the first time. In some examples, the first expandable bladder 124A or the second expandable bladder 124B may be deployed individually, for example, without necessarily deploying the other of the expandable bladders. By deploying the expandable curtain 122 and/or the expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second expandable bladders 124A and 124B and expandable curtain 122. Additionally, or alternatively, by deploying the expandable curtain 122 and/or the expandable bladders 124A or 124B independently, replacement costs may be minimized, as only those deployed members would need replacing or refurbishing.

The example vehicle 102 shown in FIGS. 1-3 may include a first seat 106A coupled to a portion the vehicle 102 and facing the first direction 114 relative to a longitudinal axis of the vehicle 102, and the vehicle 102 may also include a second seat 106B (FIG. 1) coupled to a portion the vehicle 102 and facing the second direction 116 opposite the first direction 114. In some examples of the occupant protection system 120, the first side 204 of the expandable curtain 122 and the second side 210 of the expandable curtain 122 may extend from the transverse portion 212 of the expandable curtain 122 in the second direction 116 toward the first seat 106A. The first expandable bladder 124A may be configured to deploy between the transverse portion 212 of the expandable curtain 122 and the first seat 106A.

Figure 4:
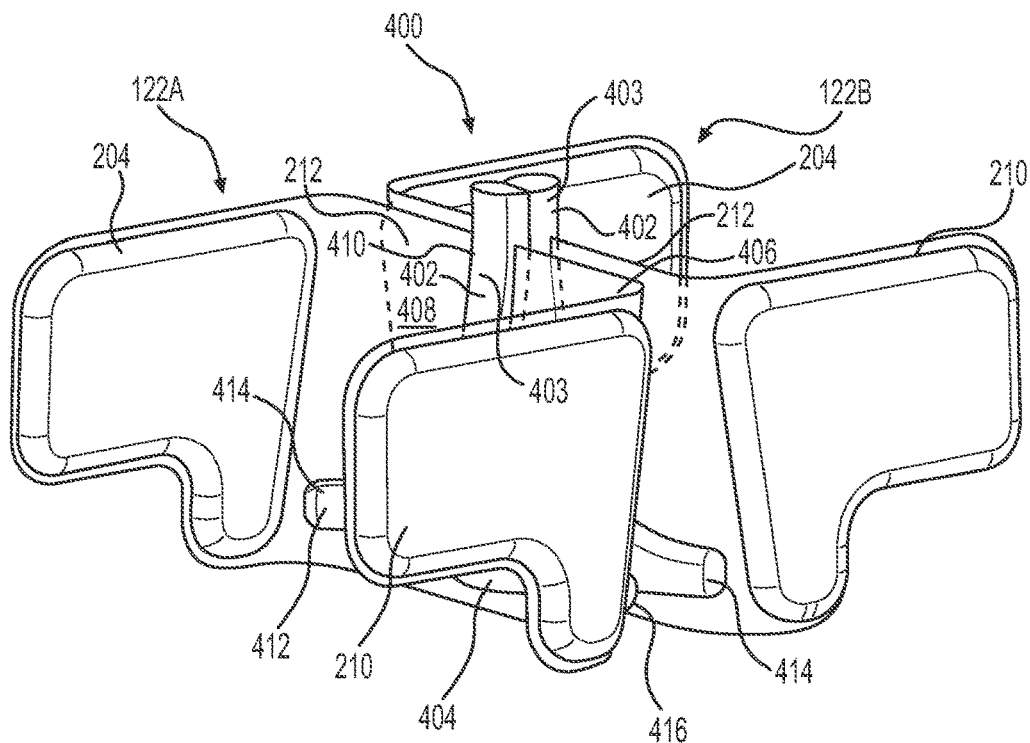
FIG. 4 is a perspective view of an example pair of expandable curtains shown in a deployed state.
Figure 5:
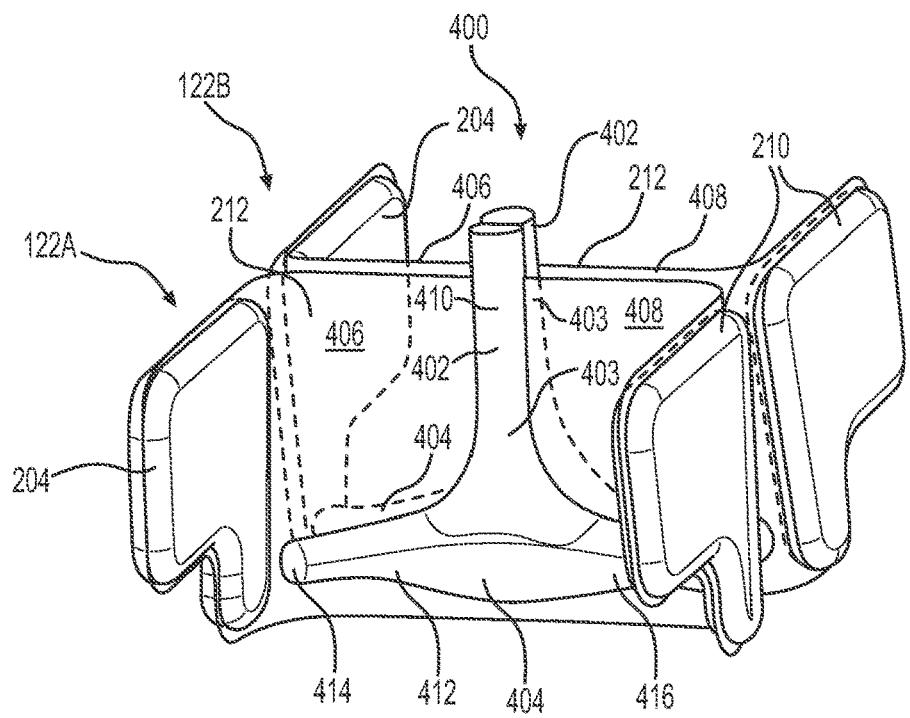
FIG. 5 is a perspective view of the example pair of expandable curtains shown in FIG. 4 showing example transverse portions of the expandable curtains.

As shown in FIGS. 4 and 5, some examples of the occupant protection system 120 may include first and second expandable curtains 122A and 122B at least partially stowed in a portion of the vehicle 102 and configured to be expanded from a stowed state to a deployed state extending between the vehicle roof 130 and the vehicle floor 202. In some such examples, the occupant protection system 120 may include a second expandable bladder 124B at least partially stowed in a portion of the vehicle 102 and configured to expand from the stowed state to the deployed state, and the second expandable curtain 122B may be configured to deploy between the first expandable curtain 122A and the second seat 106B. In some examples, the second expandable bladder 124B may be configured to deploy between the second expandable curtain 122B and the second seat 106B. In such example systems 120, protection may be provided for occupants of seats facing both directions. For example, the seats 106A and 106B may face one another, for example, as shown in FIG. 1, and the first and second expandable curtains 122A and 122B may be configured to deploy between the two seats 106A and 106B. In some examples, the deployment control system 126 may be configured to receive one or more signals indicative of a direction of travel of the vehicle 102, and cause deployment of the first expandable curtain 122A and/or the second expandable curtain 122B. For example, the first expandable curtain 122A, the first expandable bladder 124A, the second expandable curtain 122B, and/or the second expandable bladder 124B may be deployed based at least in part on the one or more signals indicative of the direction of travel of the vehicle 102.

For example, if the vehicle 102 is traveling with the first seat 106A facing the direction of travel (e.g., the first direction 114), before or during a collision, the deployment control system 126 may deploy the first expandable curtain 122A and/or the first expandable bladder 124A (e.g., associated with (e.g., within an effective distance from) the first seat 106A), and if the vehicle 102 is traveling with the second seat 106B facing the direction of travel (e.g., the second direction 116), before or during a collision, the deployment control system 126 may deploy the second expandable curtain 122B and/or the second expandable bladder 124B (e.g., associated with (e.g., within an effective distance from) the second seat 106B).

FIGS. 4 and 5 show an example pair 400 of first and second expandable curtains 122A and 122B oriented relative to one another in example orientations consistent with the example vehicle shown FIG. 1, for example, a vehicle 102 having opposite facing seats 106A and 106B. As shown, the example expandable curtains 122A and 122B include a first side 204 configured to extend along a portion of a first interior side 206 of the vehicle 102, and a second side 210 configured to extend along a portion of a second interior side of the vehicle 102. The example expandable curtains 122A and 122B also include a transverse portion 212 extending between the first side 204 and the second side 210 of the expandable curtains 122A and 122B. In the examples shown, the transverse portions 212 of the expandable curtains 122A and 122B, each include an expandable support chamber 402 extending in a direction along the length L of the expandable curtains 122A and 122B (see FIG. 2). The example expandable support chamber 402 includes a vertical portion 403 configured to extend in the direction of length L (see FIG. 2) at least a portion of the distance between the vehicle roof 130 and the vehicle floor 202 when expanded. In some examples, the vertical portion 403 may extend diagonally at least a portion of the distance between the vehicle roof 103 and the vehicle floor 202 when expanded (e.g., while still extending vertically, the vertical portion 403 may also extend laterally across at least a portion of the respective transverse portion 212 of the respective expandable curtain 122). The example expandable support chamber 402 also includes a horizontal portion 404 extending at least partially from the first side 204 to the second side 210 of the expandable curtain 122, for example, in a direction normal to the length L (see FIG. 2) of the expandable curtains 122A and 122B.

In the examples shown, the transverse portions 212 also each include a first lateral portion 406 extending between the first side 204 of the expandable curtains 122A and 122B, the vertical portion 403, and the horizontal portion 404, and a second lateral portion 408 extending between the second side 210 of the expandable curtains 122A and 122B, the vertical portion 403, and the horizontal portion 404. In the examples shown, the first and second lateral portions 406 and 408 are not expandable, but rather, form a web between the first side 204 and second side 210, the vertical portion 403, and the horizontal portion 404. In some examples, one or more of the first and second lateral portions 406 and 408 may be expandable. Although the first and second expandable curtains 122A and 122B are depicted as being the same, they may differ from one another. In some examples, the first and second expandable curtains 122A and 122B may be formed as a single expandable curtain, for example, with a common transverse portion 212, rather than being separately deployable expandable curtains 122A and 122B.

In the examples shown in FIGS. 4 and 5, the vertical portion 403 defines a raised portion 410 between the first lateral portion 406 and the second lateral portion 408 of the transverse portion 212 of the expandable curtains 122A and 122B. For example, the vertical portion 403 may include a tubular portion having a cross-sectional area in a plane transverse to a direction along the length L (see FIG. 2) of the expandable curtains 122A and 122B that increases as the vertical portion 403 approaches the horizontal portion 404.

In some examples, the horizontal portion 404 may include a lower tubular portion 412 having a cross-sectional area in a plane substantially parallel to the first and second sides 204 and 210 of the expandable curtains 122A and 122B that increases as the horizontal portion 404 approaches the vertical portion 403, for example, as shown in FIGS. 4 and 5. In some examples, the transverse portion 212 of the expandable curtains 122A and 122B defines a support face side 302, and the lower tubular portion 412 of the horizontal portion 404 extends from a first end 414 to a second end 416, wherein the first end 414 and second end 416 curve away from the support face side 302 of the transverse portion 212 of the expandable curtains 122A and 122B (e.g., as viewed from above).

As shown in FIGS. 4 and 5, each of the expandable curtains 122A and 122B is configured such that the first side 204 of the expandable curtains 122A and 122B, the first lateral portion 406 of the transverse portion 212, the expandable support chamber 402, the second lateral portion 408 of the transverse portion 212, and the second side 210 of the expandable curtains 122A and 122B may form a contiguous barrier extending from the first side 204 to the second side 210 of the expandable curtains 122A and 122B. In some examples, the first side 204, the second side 210, and the transverse portion 212 may be separate components, but contiguous. In some examples, the first side 204, the second side 210, and the transverse portion 212 may form a continuous barrier extending from the first side 204 to the second side 210 of one or more of the expandable curtains 122A and 122B.

Figure 6:
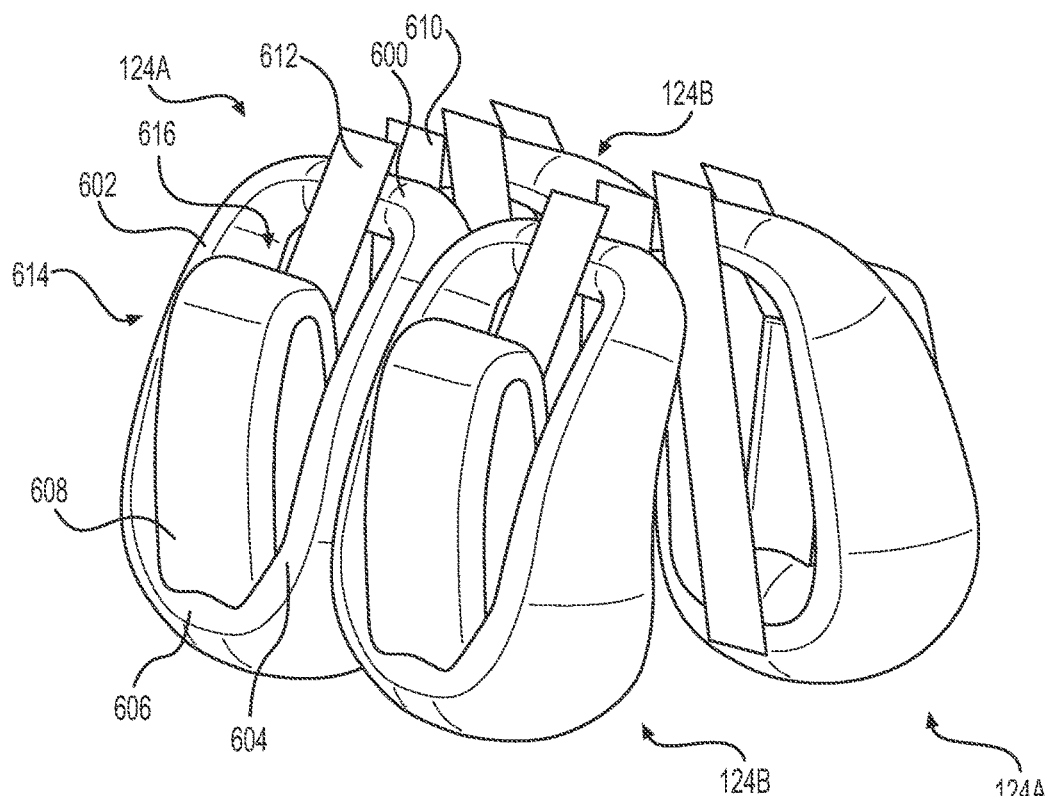
FIG. 6 is a perspective view of example expandable bladders.
Figure 7:
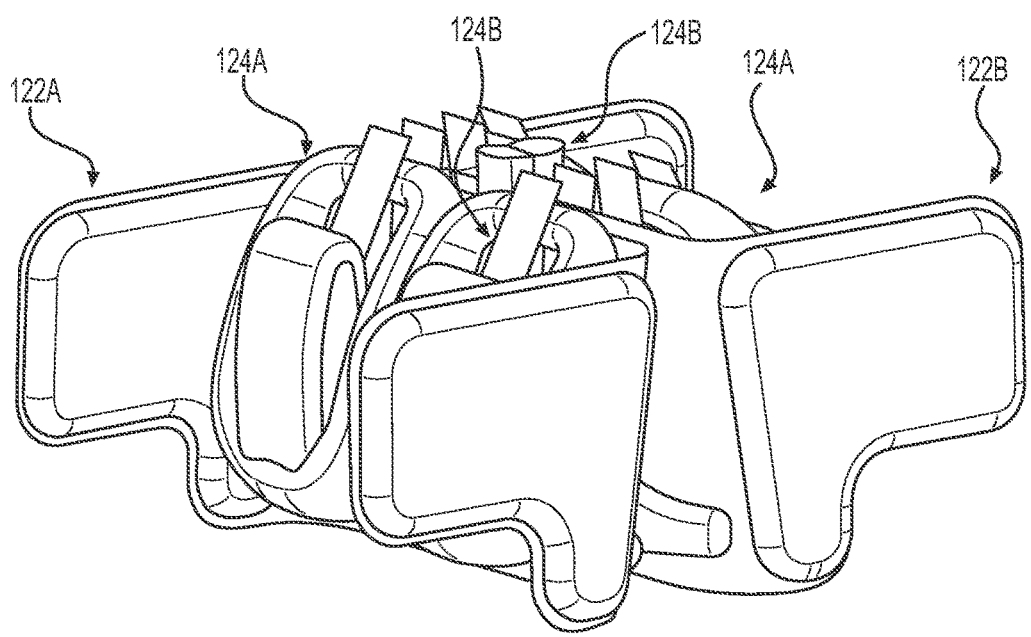
FIG. 7 is a perspective view of the example expandable curtains shown in FIGS. 4 and 5, and the example expandable bladders shown in FIG. 6, with the expandable bladders in an example arrangement relative the expandable curtains.

FIG. 6 shows example expandable bladders 124A and 124B in a deployed state, and FIG. 7 shows the example the expandable bladders 124A and 124B in relation to two example expandable curtains 122A and 122B all in a deployed state. In the examples shown in FIGS. 6 and 7, the occupant protection system 120 includes two first expandable bladders 124A configured to expand from a stowed state to a deployed state associated with (e.g., directly or indirectly coupled to) the expandable curtain, such that the first expandable bladders 124A in the deployed state nest between the first side 204 and the expandable support chamber 402 of each of the expandable curtains 122A and 122B. As shown, some examples may also include two second expandable bladders 124B configured to expand from a stowed state to a deployed state associated with the expandable curtains 122A and 122B, such that the second expandable bladders 124B in the deployed state nest between the second side 210 and the expandable support chamber 402 of each of the expandable curtains 122A and 122B. Different numbers of expandable bladders 124 are contemplated.

In the examples shown in FIGS. 6 and 7, each of the expandable bladders 124 is configured to expand from a stowed state to a deployed state, and include a coupling portion 600 configured to be coupled to a portion of the vehicle 102 associated with (e.g., directly or indirectly coupled to) a vehicle roof 130. For example, the coupling portion 600 may be coupled directly or indirectly to the vehicle roof 130, for example, such that the coupling portion 600 is suspended from the vehicle roof 130 and supports the expandable bladders 124. The example expandable bladders 124 shown in FIGS. 6 and 7 also include a first expandable lateral arrester 602 associated with (e.g., directly or indirectly coupled to and/or in flow communication with) the coupling portion 600, and a second expandable lateral arrester 604 associated with (e.g., directly or indirectly coupled to and/or in flow communication with) the coupling portion 600. The example expandable bladders 124 also include a lower support 606 associated with (e.g., directly or indirectly coupled to and/or in flow communication with) the first and second expandable lateral arresters 602 and 604, and a central expandable arrester 608 associated with (e.g., directly or indirectly coupled to and/or in flow communication with) the lower support 606 and configured to pivot relative to the lower support 606 upon contact with a portion of an occupant 104 of the vehicle 102, as explained herein. For example, a lower portion of the central expandable arrester 608 may be coupled to the lower support 606, for example, with substantially the remainder of the central expandable arrester 608 being substantially free to pivot about the lower portion.

The expandable bladders 124 shown in FIGS. 6 and 7 also each include a first strap 610 coupled to the lower support 606 and configured to be coupled to a portion of the vehicle 102 associated with (e.g., directly or indirectly coupled to) the vehicle roof 130 (e.g., a structural member of the vehicle chassis and/or an interior panel), and a second strap 612 coupled to the central expandable arrester 608 and configured to be coupled to a portion of the vehicle 102 associated with (e.g., directly or indirectly coupled to) the vehicle roof 130. In some examples, the first strap 610 may be configured to assist with stabilizing and/or supporting its respective expandable bladder 124. In some examples, the second strap 612 may be configured to assist with positioning and supporting the central expandable arrester 608 before and during contact with the occupant 104.

In the examples shown in FIGS. 6 and 7, one or more of the coupling portion 600, the first expandable lateral arrester 602, the second expandable lateral arrester 604, or the lower support 606 form an expandable arrester chamber 614. For example, the coupling portion 600, the first expandable lateral arrester 602, the second expandable lateral arrester 604, and the lower support 606 may form a continuous expandable arrester chamber 614. In some examples, the continuous expandable arrester chamber 614 is substantially ring-shaped and defines a central space 616, and the continuous expandable arrester chamber 614 and the central expandable arrester 608 are configured, such that the central expandable arrester 608 pivots into the central space 616 upon contact by the occupant 104 of the vehicle 102, for example, as explained herein. For example, the central expandable arrester 608 and the first and second expandable lateral arresters 602 and 604 are configured such that the central expandable arrester 608 pivots to position at least partially between the first and second expandable lateral arresters 602 and 604 upon contact with the portion of the occupant 104 of the vehicle 102. In some examples, the central expandable arrester 608 and the first and second expandable lateral arresters 602 and 604 are configured such that shoulders of the occupant 104 of the vehicle 102 contact the first and second expandable lateral arresters 602 and 604, and the head of the occupant 104 contacts the central expandable arrester 608.

In some examples, the first strap 610 and the second strap 612 may be formed from a partially elastic material. In some examples, the first and second straps 610 and 612 may be formed from the same material, and in some examples, the first and second straps 610 and 612 may be formed from a different material, for example, such that the second strap 612 is relatively more elastic than the first strap 610.

Figure 8A:
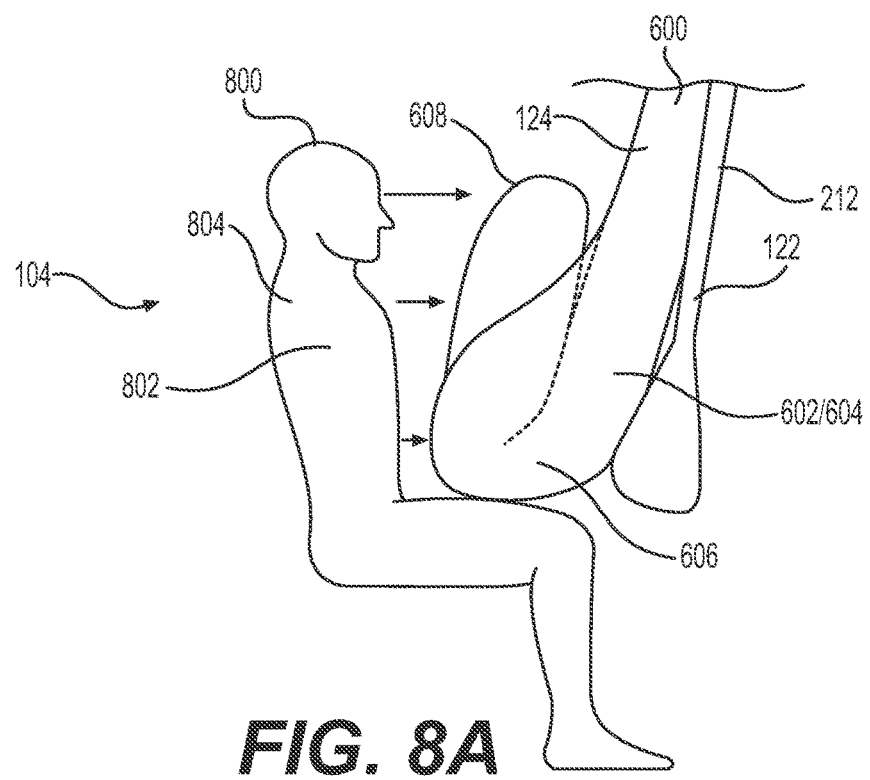
FIG. 8A is a schematic diagram showing an example vehicle occupant before contacting an example expandable bladder supported by an example expandable curtain.
Figure 8B:
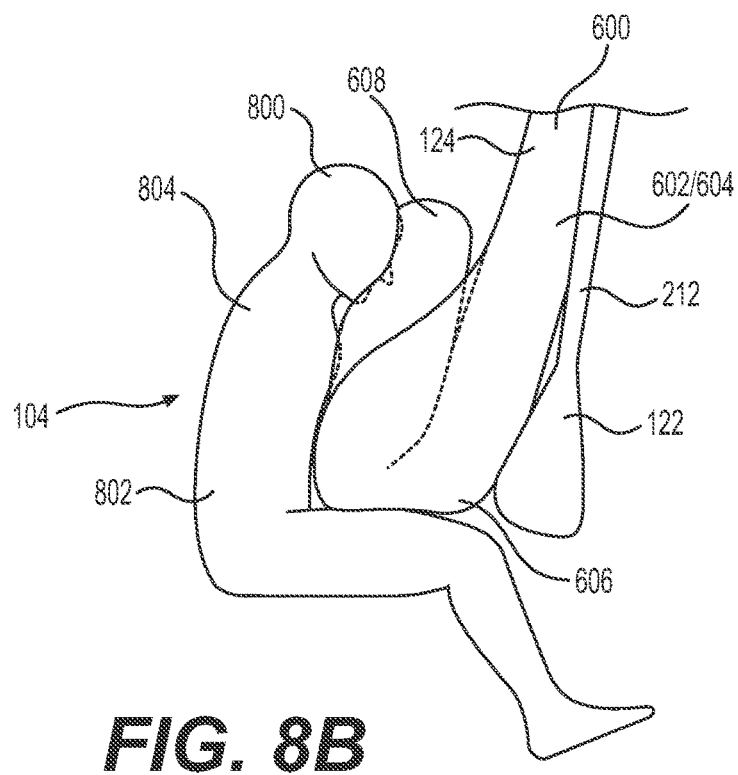
FIG. 8B is a schematic diagram showing the example occupant from FIG. 8A contacting the example expandable bladder.

FIGS. 8A and 8B are schematic sequence views of an example occupant 104 during a collision involving a vehicle 102 including an example occupant protection system 120. In the examples shown, the occupant protection system 120 includes an expandable curtain 122 including at least a transverse portion 212 suspended from the vehicle roof 130, and an expandable bladder 124 suspended from the vehicle roof 130 and including a coupling portion 600, first and second expandable lateral arresters 602 and 604, a lower support 606, and a central expandable arrester 608. FIG. 8A shows the example expandable curtain 122 and the example expandable bladder 124 in the deployed state with the occupant 104 still seated in the seat 106. As explained herein, in some examples the deployment control system 126 may receive one or more signals from the vehicle 102 indicative of a collision or a predicted collision involving the vehicle 102, and the deployment control system 126 may activate one or more inflators 134 to deploy the expandable curtain 122 and/or the expandable bladder 124. In some examples, only expandable bladders 124 associated with seats 106 in which occupants 104 have been detected will be deployed. For example, only expandable bladders 124 in front of and close enough to the occupied seats that would be effective in arresting movement of the respective occupants during a collision will be deployed.

FIG. 8B shows the example occupant 104 being thrown forward in the vehicle 102 during a collision. In the example shown, the occupant's head 800 and torso 802 are thrown forward into the expandable bladder 124, and the expandable bladder 124, supported by the expandable curtain 122, arrests the forward movement of the occupant 104 in a cushioned manner to reduce the likelihood of injury. In some examples, the occupant's head 800 contacts the central expandable arrester 608, which pivots relative to the lower support 606 as described herein, and the occupant's shoulders 804 contact the first and second expandable lateral arresters 602 and 604, which arrest the forward movement of the occupant's shoulders 804 in a cushioned manner.

Figure 9:
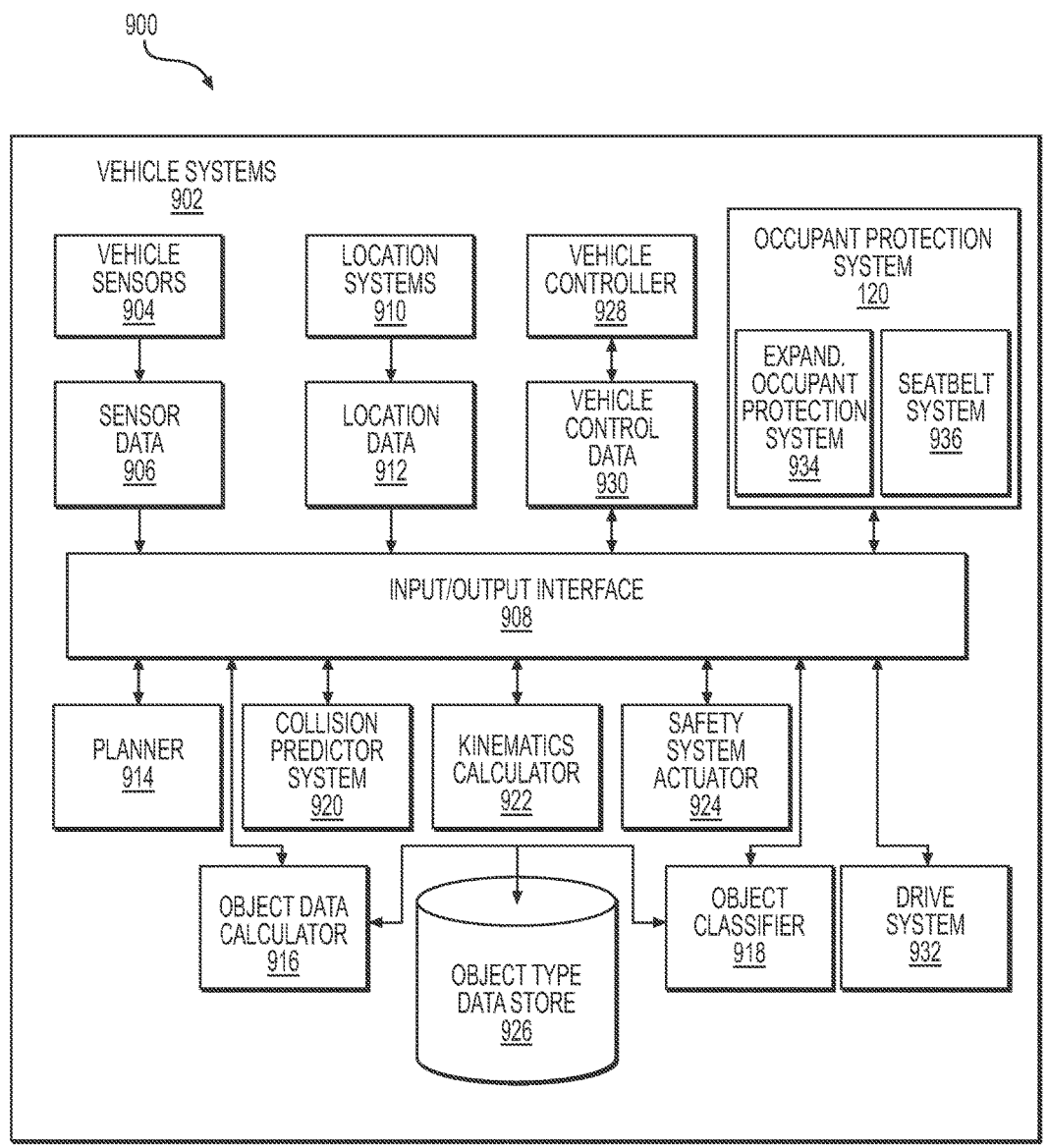
FIG. 9 is a block diagram showing an example architecture for vehicle systems including an example occupant protection system.

FIG. 9 is a block diagram of an example architecture 900 including vehicle systems 902 for controlling operation of the systems that provide data associated with operation of the vehicle 102, and that control operation of the vehicle 102. In various implementations, the architecture 900 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 900 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 900 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 900 shown in FIG. 9, the example vehicle systems 902 include a plurality of vehicle sensors 904, for example, configured to sense movement of the vehicle 102 through the environment, sense environmental data, such as the ambient temperature, pressure, and humidity, and/or sense objects in the environment surrounding the vehicle 102. In some examples, the vehicle sensors 904 may include sensors configured to identify a location on a map. The vehicle sensors 904 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 904 may also include, for example, inertial measurement units (IMUs), accelerometers, and gyroscopes. The vehicle sensors 904 may be configured to provide sensor data 906 representative of the sensed objects and signals to the vehicle systems 902 via, for example, an input/output (I/O) interface 908. Other types of sensors and sensor data are contemplated.

The example vehicle systems 902 also include location systems 910 configured to receive location information, including position and orientation data (e.g., a local position or local pose) from the vehicle sensors 904 and/or external sources, and provide location data 912 to other portions of the vehicle systems 902 via the I/O interface 908. The external sources may include global satellites for facilitating operation of a global positioning system (GPS) and/or a wireless network for communicating and receiving information related to the vehicle's location, such as map data. The location systems 910 may also include sensors configured to assist with navigation of the vehicle 102, such as wheel encoders for sensing the rotation of the wheels, inertial navigation sensors, such as gyroscopes and/or accelerometers, and/or cameras, LIDAR, RADAR, etc. for obtaining image data for dead-reckoning navigation and/or SLAM-based approaches to localization.

The example vehicle systems 902 may also include one or more of a planner 914, an object data calculator 916, an object classifier 918, a collision predictor system 920, a kinematics calculator 922, and a safety system actuator 924. The vehicle systems 902 may be configured to access one or more data stores including, but not limited to, an object type data store 926. The object type data store 926 may include data representing object types associated with object classifications for objects detected in the environment.

The example vehicle systems 902 shown in FIG. 9 also include a vehicle controller 928 configured to receive vehicle control data 930, and based on the vehicle control data 930, communicate with a drive system 932 (e.g., a steering system, a propulsion system, suspension system, and/or a braking system) to control operation of the vehicle 102. For example, the vehicle control data 930 may be derived from data received from one of more of the vehicle sensors 904 and one or more of the planner 914, the object data calculator 916, the object classifier 918, the collision predictor system 920, the kinematics calculator 922, and the safety system actuator 924, and control operation of the drive system 932, so that operation and maneuvering of the vehicle 102 is executed.

In some examples, the planner 914 may be configured to generate data representative of a trajectory of the vehicle 102, for example, using data representing a location of the vehicle 102 in the environment and other data, such as local pose data, that may be included in the location data 912. In some examples, the planner 914 may also be configured to determine projected trajectories predicted to be executed by the vehicle 102. The planner 914 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 914 may be configured to predict more than a single predicted object trajectory. For example, the planner 914 may be configured to predict multiple object trajectories based on, for example, probabilistic determinations or multi-modal distributions of predicted positions, trajectories, and/or velocities associated with an object.

In some examples, the object data calculator 916 may be configured to provide data representative of, for example, one or more of the location of an object in the environment surrounding the vehicle 102, an object track associated with the object, and an object classification associated with the object. For example, the object data calculator 916 may be configured to receive data in the form of sensor signals received from one or more of the vehicle sensors 904 and determine data representing one or more of the location in the environment of the object, the object track, and the object classification.

In some examples, the object classifier 918 may be configured to access data from the object type data store 926, which may be configured to store data representing object types, such as, for example, a species of an object classification, a subclass of an object classification, and/or a subset of an object classification. The object classifier 918, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 920 may be configured to use the data representing the object type, the data representing the trajectory of the object, and/or the data representing the trajectory of the vehicle 102, to predict a collision between the vehicle 102 and the object.

In some examples, the kinematics calculator 922 may be configured to determine data representing one or more scalar and/or vector quantities associated with motion of objects in the environment, including, but not limited to, velocity, speed, acceleration, deceleration, momentum, local pose, and/or force. Data from the kinematics calculator 922 may be used to compute other data, including, but not limited to, data representing an estimated time to impact between an object and the vehicle 102, and data representing a distance between the object and the vehicle 102. In some examples, the kinematics calculator 922 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 922 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 924 may be configured to activate one or more safety systems of the autonomous vehicle 102 when a collision is predicted by the collision predictor 920 and/or the occurrence of other safety related events, such as, for example, an emergency maneuver by the vehicle 102, such as hard braking or a sharp acceleration. The safety system actuator 924 may be configured to activate an interior safety system (e.g., including sending one or more signals to the deployment control system 126 of the occupant protection system 120), an exterior safety system (e.g., including warning sounds and/or warning lights), the drive system 932, which may be configured to execute an emergency maneuver to avoid a collision, and/or any combination thereof. For example, the drive system 932 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

Some examples of the vehicle systems 902 may operate according to the following example. Data representing a trajectory of the vehicle 102 in the environment may be received by the vehicle controller 928. Object data associated with an object in the environment may be calculated. Sensor data 906 from one or more of the vehicle sensors 904 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 916, based on the object data, may be used to determine data representing the object's location in the environment, data representing whether the object is moving, and data representing a classification associated with the object.

In some examples, the planner 914 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 920 may be used to predict a collision between the vehicle 102 and an object in the environment based on the object type, whether the object is moving, the trajectory of the vehicle 102, the predicted path of the object obtained from the planner 914. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 924 may be configured to actuate one or more portions of a safety system of the vehicle 102 when a collision is predicted. For example, the safety system actuator 924 may activate one or more safety systems of the vehicle 102, such as, for example, one or more of the interior safety systems, one or more of the exterior safety systems, and one or more of the components of the drive system 932 (e.g., the steering system, the propulsion system, and/or the braking system) via the vehicle controller 928. In some examples, the vehicle controller 928 may determine that the interior safety system will be activated based on some action of an object in the environment, and the vehicle control data 930 may include information configured to cause the vehicle controller 928 to activate one or more functions of the interior safety system, the exterior safety system, and the drive system 932.

As shown in FIG. 9, the example vehicle systems 902 also include the occupant protection system 120, which may operate as described herein. In some examples, the occupant protection system 120 may include an expandable occupant protection system 934 and a seatbelt system 936, which may be in communication with other vehicle systems 902 via the input/output interface 908. For example, the occupant protection system 120 may be in communication with the safety system actuator 924, and the deployment control system 126 may receive one or more signals from the vehicle systems 902 and activate the portions of the expandable occupant protection system 934, for example, as described herein.

Figure 10:
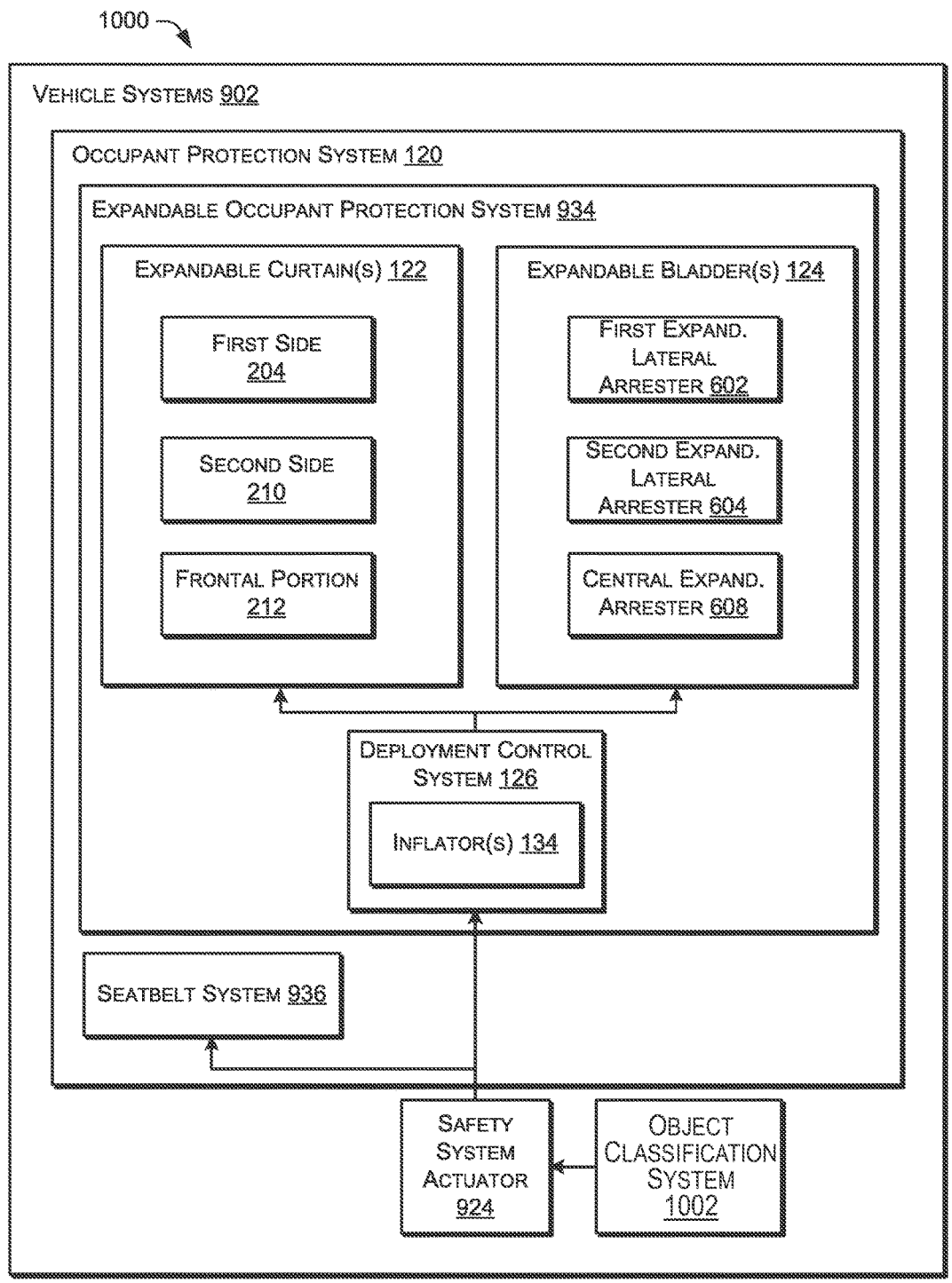
FIG. 10 is a block diagram including an example architecture for an occupant protection system.

FIG. 10 shows an example architecture 1000 including the vehicle systems 902 and the example occupant protection system 120. In the example shown, the example occupant protection system 120 includes an expandable occupant protection system 934 and a seatbelt system 936, which controls operation of systems related to the seatbelts in the vehicle 102. In the example shown, the expandable occupant protection system 934 includes one or more expandable curtains 122 and one or more expandable bladders 124, for example, as described herein. The expandable curtain(s) 122 may include one or more of a first side 204, a second side 210, and a transverse portion 212 extending between the first side 204 and second side 210 and, in some examples, coupling the first and second sides 204 and 210 to one another. The expandable bladder(s) 124 may include one or more of a first expandable lateral arrester 602, a second expandable lateral arrester 604, and a central expandable arrester 608, for example, as described herein.

In the example architecture 1000 shown in FIG. 10, the occupant protection system 120 also includes a deployment control system 126, which may include one or more inflators 134 configured to supply fluid and/or gas to the expandable curtain(s) 122 and/or the expandable bladder(s) 124, for example, when activated by the deployment control system 126, as described herein.

In some examples, the deployment control system 126 may be configured receive a signal indicative of a predicted collision involving the vehicle 102 and/or a collision involving the vehicle 102, and cause deployment of one or more expandable curtains 122, and/or one or more expandable bladders 124 based at least in part on the signal(s). For example, the vehicle sensors 904 may provide information to the collision predictor system 920, which may predict a collision with an object in the environment through which the vehicle 102 is travelling. The collision predictor system 920 may provide information to the safety actuator system 924, which in turn, provides one or more signals to the deployment control system 126, which may activate one more inflators 134 to cause deployment of one or more expandable curtains 122 and/or one or more expandable bladders 124.

In some examples, the deployment control system 126 may be configured to receive one or more signals indicative of the presence of an occupant 104 in a first location of the vehicle 102 associated with (e.g., within an effective range of) one of the expandable bladders 124, and cause deployment of the corresponding expandable bladder 124 associated with the position of the occupant 104 based at least in part on the one or more signals. For example, the vehicle systems 902 may include an object classification system 1002 configured to determine information related, for example, to whether an object and/or occupant 104 is present in one or more of the respective seats 106 of the vehicle 102. In some examples, the object classification system 1002 may leverage one or more of the vehicle sensors 904 and determine information about the object and/or occupant 104, such as, for example, the size and/or weight of the object and/or occupant 104 (e.g., whether the occupant 104 is an adult, a child, or an infant). As a non-limiting example, image systems (e.g., cameras) internal to the vehicle 102 may determine presence of an occupant 104 in a seat 106. If no occupant 104 is present, the deployment control system 126 may receive one or more signals associated with whether an occupant 104 is in the seat 106, for example, via the safety system actuator 924, and based at least in part on the one or more signals, determine whether to initiate deployment of, before or during a collision, the expandable curtain 122 and/or the expandable bladder 124 associated with (e.g., within an effective range of) the seat 106. For example, if an occupant 104 is not present in the seat 106, the deployment control system 126 may not initiate deployment of the expandable curtain 122 or the expandable bladder 124. This may prevent unnecessary deployment and prevent costs associated with servicing deployed parts of the occupant protection system 120. Alternatively, if an occupant 104 is present in the seat 106, the deployment control system 126 may initiate deployment of the expandable curtain 122 and/or the expandable bladder 124 associated with (e.g., within an effective range of) the position of the occupant 104 to protect the occupant 104 during the collision.

In some examples, the deployment control system 126 may be configured to receive one or more signals indicative of whether the occupant 104 is properly wearing a seatbelt, and cause and/or control deployment of the expandable curtain 122 and/or the expandable bladder 124 associated with the position of the occupant 104 based at least in part on the one or more signals indicative of whether the occupant 104 is properly wearing the seatbelt. For example, the vehicle sensors 904 and/or vehicle systems 902 may determine whether the occupant 104 is properly wearing a seatbelt. The deployment control system 126 may receive one or more such signals and, based at least in part on the signals, initiate and/or control deployment of the expandable curtain 122 and/or the expandable bladder 124 before or during a collision involving the vehicle 102.

For example, if the occupant 104 is wearing a seatbelt, the deployment control system 126 may reduce the deployment rate and/or the deployment volume (or pressure) of the expandable curtain 122 and/or expandable bladder 124, for example, since the seatbelt will be expected to assist with preventing injury to the occupant 104 during the collision. If, on the other hand, the occupant 104 is not properly wearing a seatbelt, the deployment control system 126 may maintain or increase the deployment rate and/or the deployment volume (or pressure) of the expandable curtain 122 and/or expandable bladder 124, for example, since the seatbelt will not be expected to assist with preventing injury to the occupant 104 during the collision.

In some examples, deployment of the expandable curtain 122 and/or one or more of the expandable bladders 124 may be affected by a number of parameters. For example, the deployment rate, the deployment volume (or pressure), the timing of deployment, and/or the sequence of deployment of one or more of the expandable curtain 122 or the expandable bladders 124 may be altered based at least in part on one or more parameters, such as, for example, the severity of a collision impact, whether one or more occupants 104 is/are properly wearing a seatbelt, and/or the size and/or weight of the occupant(s) 104 (e.g., depending on whether the occupant is an adult, a child, or an infant).

In some examples, the expandable curtain 122 and one or more of the expandable bladders 124 may be deployed independently from one another. For example, the expandable curtain 122 may be deployed without deploying any of the expandable bladders 124. For example, if objects are detected in the interior 100 of the vehicle 102 and a rapid change in the speed and/or direction of travel of the vehicle 102 occurs, the expandable curtain 122 alone may be deployed to prevent objects in the vehicle 102 from being tossed around inside the vehicle 102 during the rapid change in speed and/or direction. This may be particularly useful when, for example, an occupant 104 is in a seat 106 facing a seat 106 on which one or more objects have been placed. Upon the rapid change of speed and/or direction, the expandable curtain 122 may be deployed in order to prevent the one or more objects from being thrown from the seat 106 opposite the occupant 104 into the occupant 104.

The deployment control system 126, in some examples, may be configured to receive one or more signals indicative of a direction of travel of the vehicle 102, and cause deployment of the expandable curtain 122 and/or the expandable bladder 124 based at least in part on the one or more signals indicative of the direction of travel of the vehicle 102. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., along a direction of travel) or the seat 106 is facing rearward (i.e., opposing a direction of travel). The deployment control system 126 may be configured to prevent deployment of the expandable curtain 122 and/or the expandable bladder 124 associated with the seat 106, even when occupied, for example, when the seat 106 is facing rearward based at least in part on the signals. This may prevent unnecessary deployment and costs associated with servicing deployed parts of the occupant protection system 120. Alternatively, if the seat 106 is facing forward, the deployment control system 126 may initiate deployment of the expandable curtain 122 and/or the expandable bladder 124 associated with the position of the seat 106 to protect the occupant 104 during the collision, for example, as described herein.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 900 and 1000 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 900 and 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 900 and 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 900 and 1000 may be transmitted to the architectures 900 and 1000 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 11:
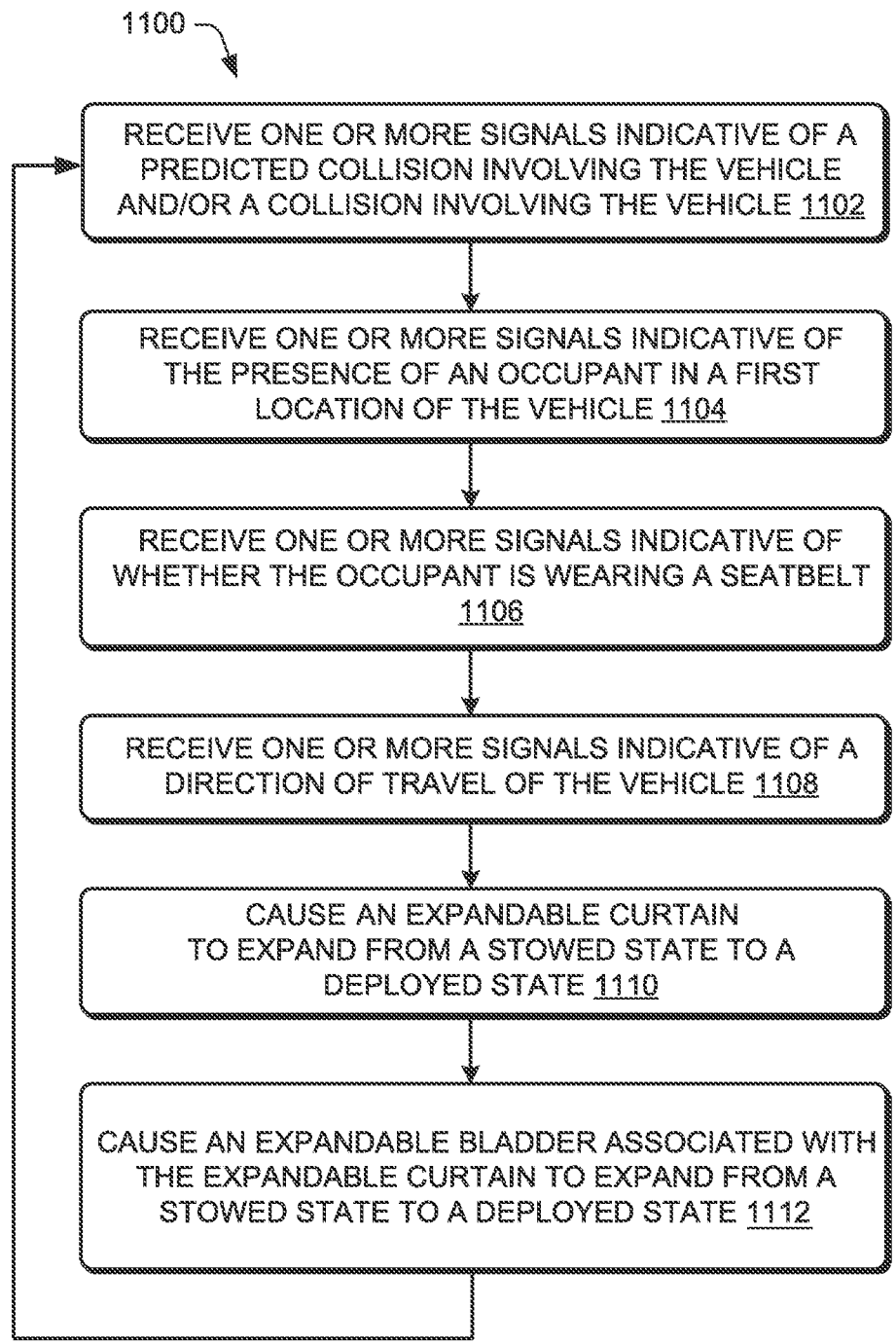
FIG. 11 is a flow diagram of an example process for deploying an expandable occupant protection system.

FIG. 11 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 11 is a flow diagram of an example process 1100 for deploying an expandable occupant protection system. At 1102, the example process 1100 may include receiving one or more signals indicative of a predicted collision involving the vehicle and/or a collision involving the vehicle. In some examples, signals indicative of a predicted collision or collision may be generated by a collision predictor system and may be received by a deployment control system, for example, as described herein.

At 1104, the example process 1100 may include receiving one or more signals indicative of the presence of an occupant in a first location of the vehicle. For example, an object classification system and/or other portions of vehicle systems may generate signals indicative of whether an occupant is present in a seat of the vehicle, and in some examples, one or more signals indicative of the seat in which the occupant is seated. In some examples, such signals may be received by the deployment control system, for example, as described herein.

At 1106, the example process 1100 may include receiving one or more signals indicative of whether the occupant is properly wearing a seatbelt. For example, vehicle sensors and/or vehicle systems may determine whether the occupant is properly wearing a seatbelt, and deployment control system may receive one or more such signals and, based at least in part on the signals, initiate and/or control deployment of portions of the expandable occupant protection system, for example, as described herein.

In some examples, the process 1100, at step 1108, may include receiving one or more signals indicative of a direction of travel of the vehicle. For example, the vehicle may be a bi-directional vehicle, and the vehicle may include sensors and/or a system configured to generate one or more signals indicative of whether the vehicle is traveling in a direction such that the seat associated with an occupant is facing forward or rearward. Such signals may be received by the deployment control system, which may deploy portions of the expandable occupant protection system, for example, as described herein.

At step 1110, some examples of the process 1100 may include causing an expandable curtain to expand from a stowed state to a deployed state extending substantially across an interior of a vehicle between a first interior side and a second interior side, for example, based on one or more of the signal types described with respect to steps 1102 through 1108. In some examples, at 1110, the process 1100 may include causing, at a first time, an expandable curtain to expand from a stowed state to a deployed state, for example, based on one or more of the signal types described with respect to steps 1102 through 1108. For example, if the deployment control system receives signals indicative of one or more of a predicted collision or collision involving the vehicle, indicative of the presence of an occupant in a seat of the vehicle, indicative of whether the occupant is properly wearing a seatbelt, or indicative that the seat in which the occupant is sitting is facing the direction of travel of the vehicle, the deployment control system may deploy and/or control deployment of the expandable curtain based on one or more of the signals, for example, as described herein.

At step 1112, the example process 1100 may include causing an expandable bladder associated with the expandable curtain to expand from a stowed state to a deployed state. In some examples, at 1112, the process 1100 may include causing an expandable bladder associated with the expandable curtain to expand from a stowed state to a deployed state. For example, the deployment control system may be configured to first deploy the expandable curtain and thereafter deploy the expandable bladder in sequence, for example, so that the expandable curtain is deployed and provides a support for the expandable bladder once the expandable bladder is deployed. In some examples, steps 1110 and 1112 may be performed concurrently (e.g., substantially simultaneously (within technical capabilities)).

In some examples of the process 1100, the expandable curtain and/or the expandable bladder may be located in a substantially central location in an interior of a vehicle, such as, for example, a vehicle having a carriage-style seating arrangement including two of more seats facing one another, for example, as described herein. In some examples, following one or more of steps 1102-1108, the process 1100 may include determining locations at which to deploy one or more of the expandable curtains and/or one or more of the expandable bladders, for example, as described herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An occupant protection system for a vehicle, the occupant protection system comprising:
    an expandable curtain configured to be expanded from a stowed state to a deployed state having a length configured to extend at least a portion of a distance between a vehicle roof and a vehicle floor, wherein the expandable curtain in the deployed state comprises:
        a first side configured to extend along a portion of a first interior side of the vehicle;
        a second side configured to extend along a portion of a second interior side of the vehicle opposite the first interior side; and
        a transverse portion extending between the first side and the second side, the transverse portion being configured to divide the vehicle,
        wherein the first side, the second side, and the transverse portion of the expandable curtain are contiguous;
    an expandable bladder comprising an occupant facing surface and a rear surface opposite the occupant facing surface, the expandable bladder configured to expand from a stowed state to a deployed state, such that in the deployed state the transverse portion of the expandable curtain comes into contact with the rear surface of the expandable bladder to provide a reaction surface for the expandable bladder; and
    a deployment control system configured to cause the expandable curtain to expand from the stowed state to the deployed state.

2. The occupant protection system of claim 1, wherein the first side, the second side, and the transverse portion of the expandable curtain define one or more of a substantially U-shaped cross-section or a substantially H-shaped cross-section.

3. The occupant protection system of claim 1, further comprising:
    a first tether coupled to at least one of the first side or the transverse portion of the expandable curtain and configured to be coupled to a portion of the vehicle; and
    a second tether coupled to at least one of the second side or the transverse portion of the expandable curtain and configured to be coupled to a portion of the vehicle.

4. The occupant protection system of claim 1, wherein the transverse portion of the expandable curtain comprises an expandable support chamber.

5. The occupant protection system of claim 4, wherein the expandable bladder is configured to nest between two or more of the first side of the expandable curtain, the second side of the expandable curtain, or the expandable support chamber of the transverse portion of the expandable curtain.

6. The occupant protection system of claim 1, further comprising a second expandable bladder configured to expand from a stowed state to a deployed state associated with the transverse portion of the expandable curtain, wherein at least one of the first expandable bladder or the second expandable bladder is coupled to the transverse portion of the expandable curtain.

7. The occupant protection system of claim 1, wherein the deployment control system is configured to:
    cause the expandable curtain to expand from the stowed state to the deployed state at a first time, and
    cause the expandable bladder to expand from the stowed state to the deployed state at a second time, the second time following the first time.

8. The occupant protection system of claim 1, wherein the deployment control system is configured to:
    receive a signal indicative of at least one of:
        a predicted collision involving the vehicle;
        a collision involving the vehicle;
        the presence of an occupant in a first location of the vehicle associated with the first expandable bladder;
        whether the occupant is properly wearing a seatbelt; or
        a direction of travel of the vehicle; and
    cause deployment of at least one of the expandable curtain or the expandable bladder based at least in part on the received signal.

9. A method for deploying an expandable occupant protection system, the method comprising:
causing an expandable curtain to expand from a stowed state to a deployed state presenting a transverse portion extending substantially across an interior of a vehicle between a first interior side and a second interior side and comprising a support face side; and
causing an expandable bladder associated with the expandable curtain to expand from a stowed state to a deployed state, such that a rear surface of the expandable bladder contacts the support face side of the transverse portion of the expandable curtain in the deployed state.

10. The method of claim 9, wherein the expandable occupant protection system is associated with a vehicle, and the method further comprises:
receiving a signal indicative of at least one of:
a predicted collision involving the vehicle;
a collision involving the vehicle;
the presence of an occupant in a first location of the vehicle;
whether the occupant is wearing a seatbelt; or
a direction of travel of the vehicle; and
causing deployment of at least one of the expandable curtain or the expandable bladder based at least in part on the received signal.

11. A vehicle comprising:
a chassis comprising a roof and a floor;
an expandable curtain at least partially stowed in a portion of the vehicle associated with the roof and configured to be expanded from a stowed state to a deployed state having a length configured to extend at least a portion of a distance between the roof and the floor, wherein the expandable curtain in the deployed state comprises:
a first side extending along a portion of a first interior side of the vehicle;
a second side extending along a portion of a second interior side of the vehicle opposite the first interior side; and
a transverse portion extending between the first side and the second side of the expandable curtain, the transverse portion dividing an interior of the vehicle,
wherein the first side, the second side, and the transverse portion of the expandable curtain are contiguous; and
an expandable bladder comprising an occupant facing surface and a rear surface opposite the occupant facing surface, the expandable bladder configured to expand from a stowed state to a deployed state, such that in the deployed state the transverse portion of the expandable curtain comes into contact with the rear surface of the expandable bladder to provide a reaction surface for the expandable bladder.

12. The vehicle of claim 11, further comprising a seat configured to receive an occupant, wherein the seat faces the transverse portion of the expandable curtain when expanded and is located between a first plane defined by the first side and a second plane defined by the second side of the expandable curtain.

13. The vehicle of claim 12, wherein the expandable bladder is at least partially stowed in a portion of the vehicle associated with the roof and configured to deploy between the transverse portion of the expandable curtain and the seat.

14. The vehicle of claim 12, wherein the transverse portion of the expandable curtain comprises a support face, and the expandable bladder is associated with the support face of the transverse portion and is located between the transverse portion and the seat of the vehicle.

15. The vehicle of claim 13, wherein the expandable bladder comprises a first expandable bladder, and the vehicle further comprises a second expandable bladder at least partially stowed in the portion of the vehicle associated with the roof and configured to expand from a stowed state to a deployed state associated with the transverse portion of the expandable curtain.

16. The vehicle of claim 13, wherein the expandable bladder comprises a first expandable bladder, and the vehicle further comprises a deployment control system configured to cause at least one of the expandable curtain or the first expandable bladder to expand from the stowed state to the deployed state, based at least in part on a signal indicative of a direction of travel of the vehicle and a signal indicative of at least one of an occupant or an object in a seat facing the direction of travel.

17. The vehicle of claim 11, further comprising:
a first seat coupled to a portion the vehicle and facing a first direction relative to a longitudinal axis of the vehicle; and
a second seat coupled to a portion the vehicle and facing a second direction opposite the first direction,
wherein the first side of the expandable curtain and the second side of the expandable curtain extend from the transverse portion of the expandable curtain in the second direction.

18. The vehicle of claim 17, wherein the expandable bladder comprises a first expandable bladder at least partially stowed in a portion of the vehicle and configured to deploy between the transverse portion of the expandable curtain and the first seat.

19. The vehicle of claim 18, wherein the expandable curtain is a first expandable curtain, and the vehicle further comprises:
a second expandable curtain at least partially stowed in a portion of the vehicle and configured to be expanded from a stowed state to a deployed state having a length configured to extend at least a portion of a distance between the roof and the floor; and
a second expandable bladder at least partially stowed in a portion of the vehicle and configured to expand from a stowed state to a deployed state,
wherein the second expandable curtain is configured to deploy between the first expandable curtain and the second seat, and
wherein the second expandable bladder is configured to deploy between the second expandable curtain and the second seat.

20. The vehicle of claim 19, further comprising a deployment control system configured to:
receive a signal indicative of a direction of travel of the vehicle; and
cause deployment of at least one of the first expandable curtain or the second expandable curtain,
wherein at least one of the first expandable curtain, the first expandable bladder, the second expandable curtain, or the second expandable bladder is deployed based at least in part on the signal indicative of the direction of travel of the vehicle.

* * * * *